(12) United States Patent
Yu et al.

(10) Patent No.: US 12,347,360 B2
(45) Date of Patent: Jul. 1, 2025

(54) DISPLAY APPARATUS AND DISPLAY METHOD FOR DISPLAY APPARATUS WITH ROTATABLE DISPLAY

(71) Applicant: Hisense Visual Technology Co., Ltd., Shandong (CN)

(72) Inventors: Shuo Yu, Shandong (CN); Yazhou Jia, Shandong (CN); Bingqing Wang, Shandong (CN); Hanyong Wu, Shandong (CN); Yanmei Yuan, Shandong (CN); Donghang Li, Shandong (CN); Guanghai Zhuang, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/691,308

(22) Filed: Mar. 10, 2022

(65) Prior Publication Data

US 2022/0198991 A1    Jun. 23, 2022

Related U.S. Application Data

(63) Continuation of application No. PCT/CN2021/080529, filed on Mar. 12, 2021.

(30) Foreign Application Priority Data

Mar. 13, 2020  (CN) .......................... 202010176801.9
Mar. 31, 2020  (CN) .......................... 202010241778.7

(51) Int. Cl.
    *G09G 3/20*    (2006.01)
(52) U.S. Cl.
    CPC ....... *G09G 3/2092* (2013.01); *G09G 2330/02* (2013.01); *G09G 2354/00* (2013.01); *G09G 2370/22* (2013.01)

(58) Field of Classification Search
    CPC ............ G09G 3/2092; G09G 2330/02; G09G 2354/00; G09G 2370/22;
    (Continued)

(56) References Cited

U.S. PATENT DOCUMENTS 5,134,390 A    7/1992  Kishimoto et al.
5,401,089 A *  3/1995  Inagaki .............. A47B 21/0073
                                                          312/7.2
(Continued)

FOREIGN PATENT DOCUMENTS

CN    101043597 A    9/2007
CN    104898920 A    9/2015
(Continued)

OTHER PUBLICATIONS

KR10-1214894 (English translation), Dec. 24, 2012.*
International Search Report, English translation, mailed Jun. 1, 2021, from PCT/CN2021/080529 filed Mar. 12, 2021.

*Primary Examiner* — Jose R Soto Lopez
(74) *Attorney, Agent, or Firm* — ANOVA LAW GROUP, PLLC

(57) ABSTRACT

Provided are a display apparatus and display method for the display apparatus with a rotatable display. A controller thereof is configured to, during a power-off state or standby state of the display apparatus, in response to an instruction for starting the display apparatus, detect a current rotation state of the rotatable display; in response to the rotatable display being in the horizontal state, control the display to present an animation for the starting of the display apparatus corresponding to the horizontal state; and in response to the rotatable display being in the portrait state, control the display to present an animation for the starting of the display apparatus corresponding to the portrait state.

16 Claims, 16 Drawing Sheets

(58) Field of Classification Search
CPC ........... G09G 2340/0492; H04N 21/41; H04N 21/431; H04N 21/443
See application file for complete search history.

(56) References Cited

U.S. PATENT DOCUMENTS

| | | | | |
|---|---|---|---|---|
| 5,552,989 | A * | 9/1996 | Bertrand | G06K 7/006 340/995.14 |
| 2002/0093483 | A1* | 7/2002 | Kaplan | G06F 1/1626 345/158 |
| 2003/0105892 | A1* | 6/2003 | Numano | G06F 1/1632 710/14 |
| 2004/0196362 | A1* | 10/2004 | Hoshino | G03B 35/24 348/E13.028 |
| 2005/0179704 | A1* | 8/2005 | Chu | F16M 11/105 340/691.6 |
| 2007/0263176 | A1* | 11/2007 | Nozaki | G03B 29/00 353/69 |
| 2008/0158260 | A1* | 7/2008 | Li | G09G 3/2092 345/658 |
| 2008/0192166 | A1* | 8/2008 | Wong | H04N 5/64 349/58 |
| 2009/0133608 | A1* | 5/2009 | Jun | F16M 11/18 108/7 |
| 2009/0189032 | A1* | 7/2009 | Su | F16M 11/08 700/13 |
| 2009/0207184 | A1* | 8/2009 | Laine | H04N 21/41265 725/39 |
| 2010/0163701 | A1* | 7/2010 | Lin | G06F 1/1601 248/310 |
| 2010/0188312 | A1 | 7/2010 | Ohdachi et al. | |
| 2010/0231608 | A1* | 9/2010 | Wang | G09G 5/34 345/659 |
| 2012/0287160 | A1* | 11/2012 | Guo | G06F 1/1605 345/649 |
| 2014/0006986 | A1 | 1/2014 | Cappucio | |
| 2014/0101535 | A1* | 4/2014 | Kim | G06F 3/04886 715/761 |
| 2014/0292776 | A1* | 10/2014 | Tanaka | G06F 3/038 345/520 |
| 2014/0333671 | A1* | 11/2014 | Phang | G06F 3/017 345/659 |
| 2015/0206284 | A1* | 7/2015 | Yang | G06F 1/1681 345/659 |
| 2016/0062774 | A1* | 3/2016 | Yuan | G06F 9/4408 713/2 |
| 2016/0284059 | A1* | 9/2016 | Gonzalez Solis | G06F 3/01 |
| 2017/0076643 | A1* | 3/2017 | Kaizu | B60N 3/023 |
| 2017/0123878 | A1* | 5/2017 | Chu | G10L 19/018 |
| 2017/0131789 | A1* | 5/2017 | Shim | G06F 3/023 |
| 2018/0313646 | A1* | 11/2018 | Hodowany | F16M 11/126 |
| 2019/0147827 | A1* | 5/2019 | Wu | G09G 3/3677 345/214 |
| 2020/0159336 | A1* | 5/2020 | Torres | H01H 13/83 |
| 2020/0225696 | A1* | 7/2020 | Patel | G06F 3/147 |
| 2020/0301469 | A1* | 9/2020 | Choi | G06F 3/147 |
| 2020/0333995 | A1* | 10/2020 | Jeong | H04N 21/431 |
| 2020/0344435 | A1* | 10/2020 | Choi | G06F 3/1454 |
| 2020/0379703 | A1* | 12/2020 | Choi | H04N 21/41407 |
| 2020/0380935 | A1* | 12/2020 | Ignaszewski | G06F 1/1622 |
| 2020/0387930 | A1* | 12/2020 | Canceri | G06F 1/1607 |
| 2021/0014556 | A1* | 1/2021 | Floury | H04N 21/431 |
| 2021/0067731 | A1* | 3/2021 | Park | H04N 5/445 |
| 2021/0173439 | A1* | 6/2021 | Lee | G06F 1/1622 |
| 2021/0250557 | A1* | 8/2021 | Shimizu | H04N 9/3185 |
| 2021/0317945 | A1* | 10/2021 | Kim | G06F 1/181 |
| 2021/0318727 | A1* | 10/2021 | Paranjape | G06F 1/1681 |
| 2023/0029563 | A1* | 2/2023 | Choi | G09G 3/035 |
| 2024/0155793 | A1* | 5/2024 | Choi | H02K 7/1166 |

FOREIGN PATENT DOCUMENTS

| | | |
|---|---|---|
| CN | 105230005 A | 1/2016 |
| CN | 107333173 A | 11/2017 |
| CN | 107704242 A | 2/2018 |
| CN | 108737882 A | 11/2018 |
| CN | 110851202 A | 2/2020 |
| CN | 110865858 A | 3/2020 |
| CN | 111414204 A | 7/2020 |
| KR | 100644409 B1 | 11/2006 |
| KR | 10-1214894 | * 12/2012 |

* cited by examiner

DISPLAY APPARATUS AND DISPLAY METHOD FOR DISPLAY APPARATUS WITH ROTATABLE DISPLAY

CROSS-REFERENCE TO RELATED APPLICATIONS

This application is a continuation application of International Application No. PCT/CN2021/080529 filed on Mar. 12, 2021, which claims the priorities of the Chinese patent application No. 202010176801.9 filed on Mar. 13, 2020, and the Chinese patent application No. 202010241778.7 filed on Mar. 31, 2020. The entire contents of these applications are incorporated herein by reference.

FIELD

The present application relates to smart televisions, in particular to a display apparatus and a display method for the display apparatus with a rotatable display.

BACKGROUND

A smart television has an independent operation system, and supports function extension. Various applications may be installed in the smart television according to requirements of users, for example, social applications such as a traditional video application and a short video, and reading applications such as cartoons and book. These applications may utilize a display of the smart television to display an application picture, so as to provide rich media resources for the smart television. Meanwhile, the smart television may further be in data interaction and resource sharing with different terminals. For example, the smart television may be connected with a mobile phone in wireless communication modes such as a local area network and Bluetooth, so as to play a resource in the mobile phone or directly display a picture on the mobile phone in a cast mode.

However, since different applications or media resources from different sources have different proportions of pictures, the smart television usually displays pictures different from a traditional video proportion. For example, a video resource shot from a terminal such as a mobile phone is generally a vertical media resource with an aspect ratio being 9:16, 9:18, 3:4 or other proportions, while a picture according to a reading application is a vertical resource similar to an aspect ratio of a book. The aspect ratio on a display screen of the smart television is generally a horizontal state such as 16:9. Therefore, when the vertical media resources such as the short video and cartoon are displayed through the smart television, a vertical media resource picture cannot be normally displayed due to the fact that the picture proportion is not matched with a display screen proportion. The vertical media resource picture usually needs to be zoomed for complete displaying, causing a display space waste on a screen and bad user experience.

SUMMARY

The present application provides a display apparatus, including: a display, a rotating assembly and a controller. The rotating assembly is configured to rotate the display to a rotation state. The rotation state includes a standard state and at least one nonstandard state. The controller is configured to: in response to starting of the display apparatus, detect a current rotation state of the display; in response to the display being in the standard state, control the display to present an animation corresponding to the standard state; and in response to the display being in the nonstandard state, control the rotating assembly to rotate the display to a standard state, and control the display to display an animation corresponding to the standard state after rotation.

The present application further provides a display method for a display apparatus with a rotatable display, including: in response to starting of the display apparatus, detecting a current rotation state of the rotatable display, wherein the rotation state includes a standard state and at least one nonstandard state; in response to the display being in the standard state, controlling the display to present an animation corresponding to the standard state; and in response to the display being in the nonstandard state, controlling the rotating assembly to rotate the display to the standard state, and controlling the display to present an animation corresponding to the standard state after rotation.

DETAILED DESCRIPTION OF THE EMBODIMENTS

Figure 1A:
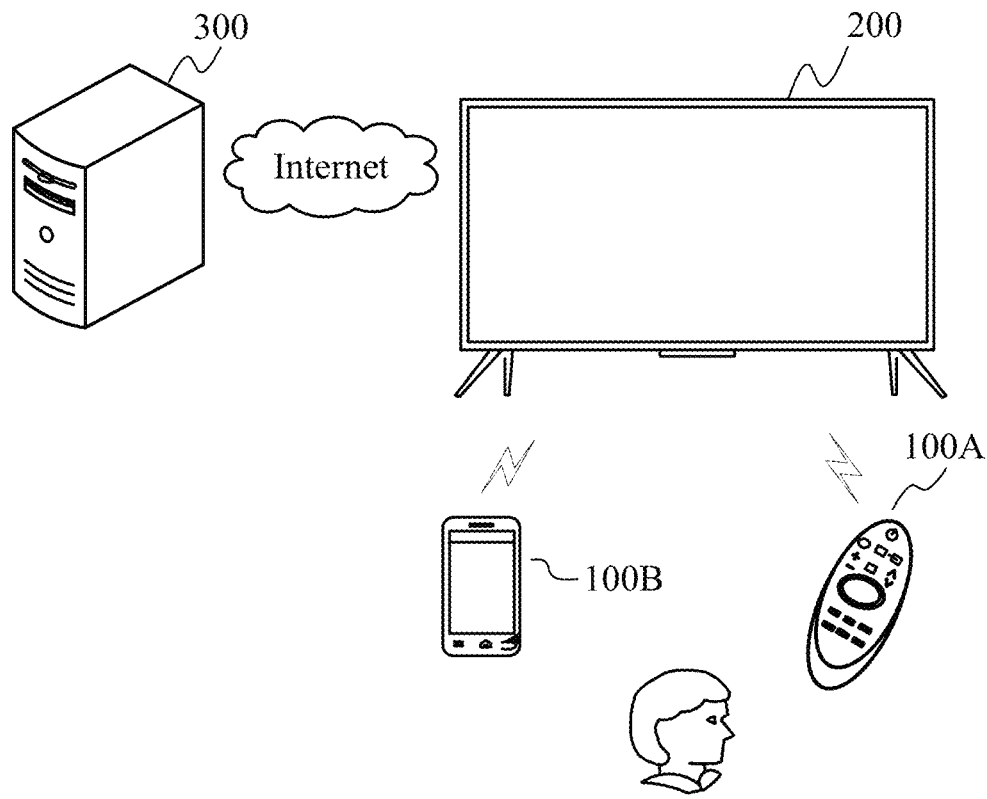
FIG. 1A is a scenario diagram of a display apparatus according to some embodiments of the present application.

In order to make those skilled in the art understand the present application better, the embodiments of the present application will be described below clearly and completely with reference to the drawings in the embodiments of the present application. Obviously, the described embodiments are only some embodiments of the present application, but not all the embodiments. On the basis of the embodiments in the present application, all other embodiments obtained by those ordinary skilled in the art without inventive efforts should fall within the protection scope of the present application.

A rotatable display apparatus is a new intelligent electronic device (a rotatable television is taken as an example hereafter), and mainly includes a display and a rotating assembly. The display is configured to fix onto a wall or a bracket through the rotating assembly, an angle of the display may be adjusted through the rotating assembly, so as to adapt to display pictures with different aspect ratios. A user may display a landscape or horizontal media resource with an aspect ratio being greater than 1 in a landscape state, and may also display a vertical media resource with an aspect ratio being smaller than 1 in a portrait state. Certainly, when the user clicks a media resource for vertical display, or enters into an application for vertical display, or inputs a rotation instruction in the landscape state, the display apparatus may be rotated from the landscape state to the portrait state, and vice versa.

For example, the display is horizontally placed in most cases, so as to display multimedia pictures with aspect ratios being 16:9, 18:9 and other proportions. When the multimedia pictures with aspect ratios being 9:16, 9:18 and other proportions, the display placed horizontally cannot display the vertical resource on a full screen, the multimedia pictures needs to be scaled down to display, and black regions or black bars are displayed on two sides of the display. In this case, the display may be vertically placed through the rotating assembly, so as to adapt to video pictures of 9:16, 9:18 and other proportions.

In the present application, a starting process refers to a process where an operation from a user is implemented to start the display apparatus, for example, starting the display apparatus by pressing (touching) a power key on a control device 100, voice input, gesture input and the like. After the display apparatus 200 is started, a first hardware in the display apparatus 200 is power on to start running, and then a control home page is entered by executing an operation system. During this period, starting of the operation system and page initialization needs to take a certain time, therefore, a brand logo and/or an animation may be played in this period, so as to fill the time that the user waits for starting.

In a starting process of the rotatable television, a LOGO of the apparatus may be displayed. After the LOGO is displayed completely, the animation is presented. After the animation is played completely, a corresponding signal source content or home page content is displayed.

Generally, playing of the animation and preparation action of a signal source may be two parallel treads. Certainly, they may also be serial, which is not limited herein. When the playing of the animation and the preparation action of the signal source are the two parallel treads, the animation can be regarded as a cover on a display screen, and back end is running preparations related to the signal source while the animation is being displayed. For example, an advertisement is played in a first tread of the animation module; meanwhile, a new second tread is created in the animation module, and based on the signal source information read, a switch to a signal source indicated by the signal source information is implemented by the second thread; and after the advertisement has been played, an interface output from the signal source is displayed according to switch state information returned from the second thread.

The rotatable television may be turned off in a portrait mode or a landscape mode in previous use. Therefore, when receiving an instruction for starting the display apparatus from a user, the landscape and portrait state of the display when turned off last time needs to be determined so as to adapt an animation with an appropriate proportion.

In order to facilitate the display to present the different starting processes under the landscape and portrait states and conveniently improve a user viewing experience of the display apparatus at the different viewing states, an embodiment of the present application provides a rotatable display apparatus, a starting method and a computer readable non-volatile medium. The display apparatus is a rotatable television, for example. It should be noted that the method according to the present embodiment is suitable for the rotatable television, and further suitable for other display apparatuses, such as a computer and a tablet computer.

The terms "remote control" used in all the embodiments of the present application refers to a component of an electronic device (such as the display apparatus disclosed in the present application). The component may usually wirelessly control the electronic device in a short distance range. The component may generally be connected with the electronic device by using an infrared and/or radio frequency (RF) signal and/or Bluetooth, and may also include functional modules such as WiFi, wireless USB, Bluetooth and a motion sensor. For example, a handheld touch remote control can replace most physical built-in hard keys in a general remote control device with a user interface in a touch screen.

The term "hardware system" used in all the embodiments of the present application may refer to physical components including mechanical, optical, electric and magnetic devices such as an integrated circuit (IC) and a printed circuit board (PCB) and having calculating, controlling, storing, inputting and outputting functions. In all the embodiments of the present application, the hardware system is usually called a motherboard or a master chip or a controller as well.

Referring to FIG. 1A, a scenario diagram of the display apparatus according to some embodiments of the present application. As shown in FIG. 1A, a control device 100 may communicate with the display apparatus 200 in a wired or wireless manner.

The control device 100 is configured to control the display apparatus 200, receive commands input from a user and convert the commands into instructions that can be recognized and responded by the display apparatus 200, and acts an interaction intermediary role between the user and the display apparatus 200. For example, the user operates a channel up or a channel down key on the control device 100, and the display apparatus 200 responds to the channel up and the channel down operation.

The control device 100 may be a remote control 100A, including infrared protocol communication or Bluetooth protocol communication and other short range communication protocols, etc., to control the display apparatus 200 via wireless or other wired manners. The user may input commands through keys, voice input, control panel and the like on the remote control to control the display apparatus 200. For example, the user may input commands through a volume up or a volume down key, a channel control key, an up/down/left/right direction key, a voice input key, a menu key, an power key and the like on the remote control, so as to realize the function of controlling the display apparatus 200.

The control device 100 may also be a smart device, such as a mobile terminal 100B, a tablet computer, a computer and a notebook computer. For example, an application running on the smart device is used to control the display apparatus 200. Through configuration, the application may provide various controls for the user on a screen associated with the smart device through an intuitive user interface (UI).

Exemplarily, software applications may be installed on both the mobile terminal 100B and the display apparatus 200, so as to realize connection and communication through a network communication protocol, and further achieve the purposes of one-to-one control operations and data communication. For example, a control instruction protocol may be established between the mobile terminal 100B and the display apparatus 200 to achieve functions of physical keys, for example, arranged on the remote control 100A by operating various functional keys or virtual controls of the user interface provided on the mobile terminal 100B. Audio and video contents displayed on the mobile terminal 100B may also be cast to the display apparatus 200 so as to realize a synchronous display function.

The display apparatus 200 may provide a broadcast reception function and a network television function that a computer supports. The display apparatus may be implemented as a digital television, a network television, an Internet protocol television (IPTV) and the like.

The display apparatus 200 may be a liquid crystal display, an organic light emitting display, and a projection device. Types, sizes, resolutions, and the like of specific display apparatuses are not limited.

The display apparatus 200 may further conduct data communication with a server 300 in multiple communication modes. Here, the display apparatus 200 may be allowed to perform communication connection through a local area network (LAN), a wireless local area network (WLAN) or the other networks. The server 300 may provide various contents and interactions for the display apparatus 200. Exemplarily, the display apparatus 200 may send and receive information, for example, receiving electronic program guide (EPG) data, receiving software program updates or accessing a remotely-stored digital media library. The server 300 may be one or more clusters, and may be one or more kinds of servers. Other network service contents such as video on demand and advertising service are provided through the server 300.

Figure 1B:
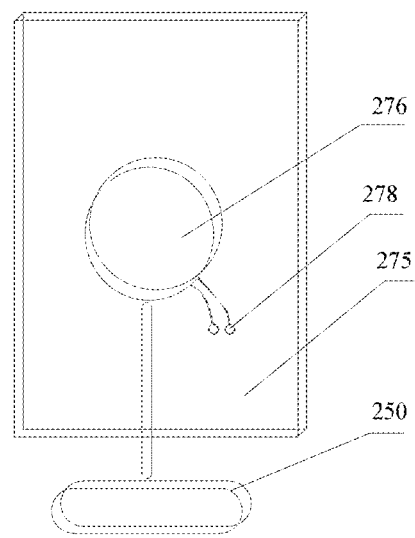
FIG. 1B is a rear view of a display apparatus according to some embodiments of the present application.

In some embodiments, as shown in FIG. 1B, the display apparatus 200 includes a rotating assembly 276, a controller 250, a display 275, a terminal interface 278 extending from a gap in a backplane. The rotating assembly 276 is connected with the backplane, and the rotating assembly 276 may enable the display 275 to rotate. From the angle of front watching of the display apparatus, the rotating assembly 276 may rotate a display screen to a portrait state, that is, a state where a vertical side length of the screen is greater than a horizontal side length, and may also rotate the screen to the landscape state, that is, a state where the horizontal side length of the screen is greater than the vertical side length. In some other embodiments, the controller 250 may be disposed in a rear shell of the display, and the rotating assembly may drive the controller to rotate together in a rotating process. Certainly, there may also be other arrangement modes, and the specific position of the controller is not specifically limited by the present application.

Figure 2:
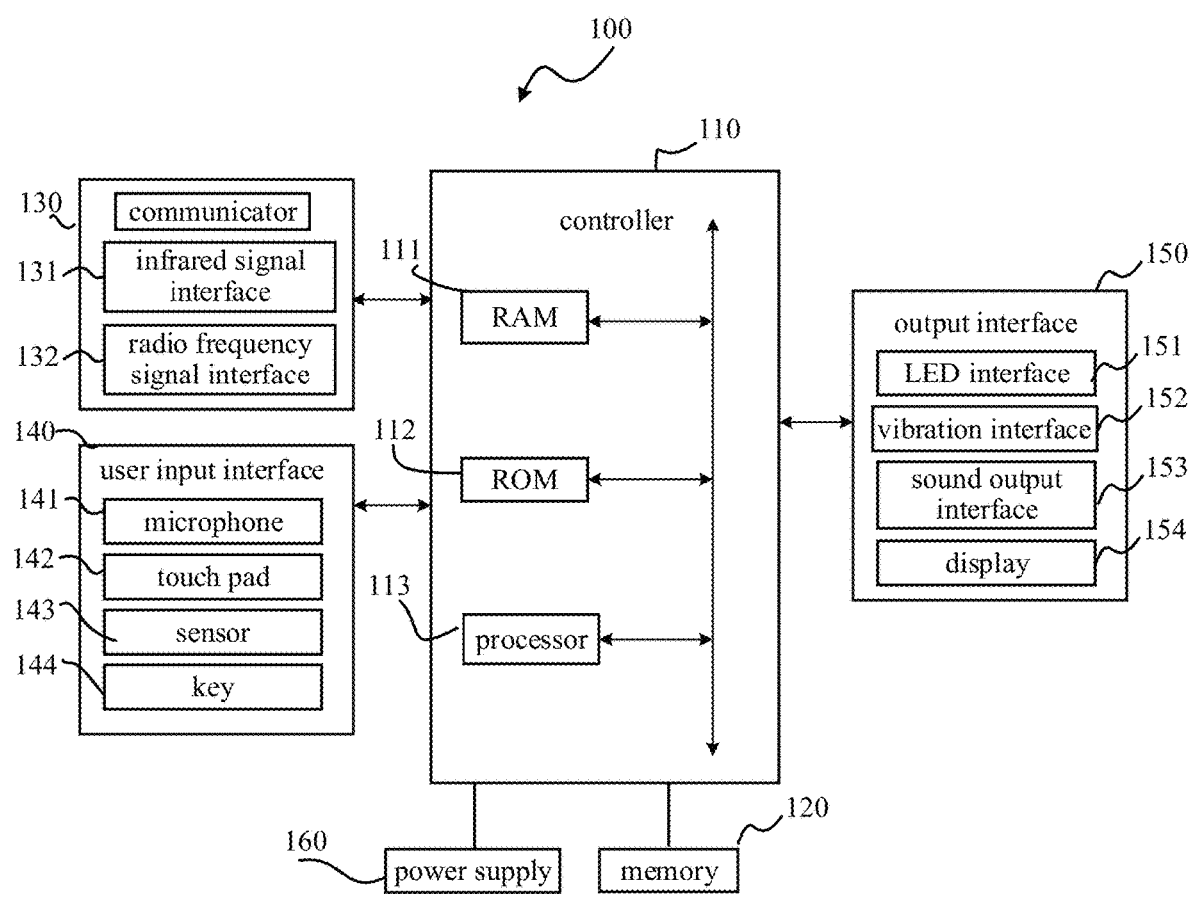
FIG. 2 is a block diagram of hardware configuration of a control device 100 in FIG. 1 according to some embodiments of the present application.

FIG. 2 illustrates a configuration block diagram of a control device 100. As shown in FIG. 2, the control device 100 includes a controller 110, a memory 120, a communicator 130, a user input interface 140, a user output interface 150, and a power supply 160. Specific configuration introduction related to the control device 100 refers to a priority document of the Chinese patent application No. 202010176801.9 filed on Mar. 13, 2020.

Figure 3:
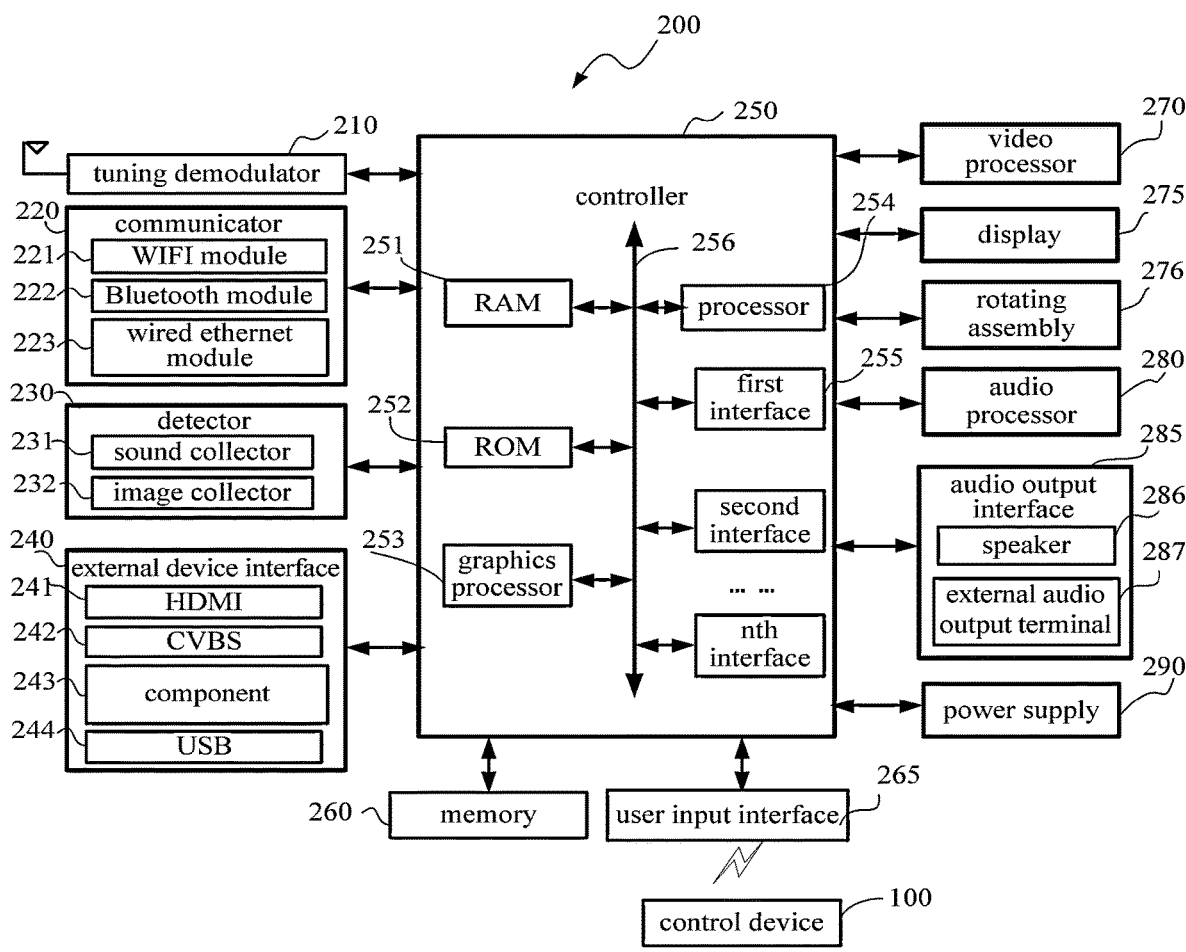
FIG. 3 is a block diagram of hardware configuration of a display apparatus 200 in FIG. 1 according to some embodiments of the present application.

FIG. 3 illustrates a block diagram of hardware configuration of a display apparatus 200. As shown in FIG. 3, the display apparatus 200 may include a tuning demodulator 210, a communicator 220, a detector 230, an external device interface 240, a controller 250, a memory 260, a user interface 265, a video processor 270, a display 275, a rotating assembly 276, an audio processor 280, an audio output interface 285, and a power supply 290.

The rotating assembly 276 may include a driving motor, a rotating shaft and other parts. The driving motor may be connected with the controller 250, and outputs a rotating angle under control of the controller 250. One end of the rotating shaft is connected with a power output shaft of the driving motor, and the other end of the rotating shaft is connected with the display 275, so that the display 275 may be fixedly installed on a wall or a bracket through the rotating assembly 276.

The rotating assembly 276 may further include other parts, such as a transmission component and a detecting component. The transmission component may adjust a rotating speed and torque output by the rotating assembly 276 through a specific transmission ratio, and may be in a gear transmission mode. The detecting component may include sensors disposed on the rotating shaft, such as an angle sensor and an attitude sensor. These sensors may detect parameters such as a rotating angle of the rotating assembly 276, and send the detected parameters to the controller 250, so that the controller 250 can determine or adjust a state of the display apparatus 200 according to the detected parameters. In implementations, the rotating assembly 276 may include but is not limited to one or more of the above components.

Figure 4:
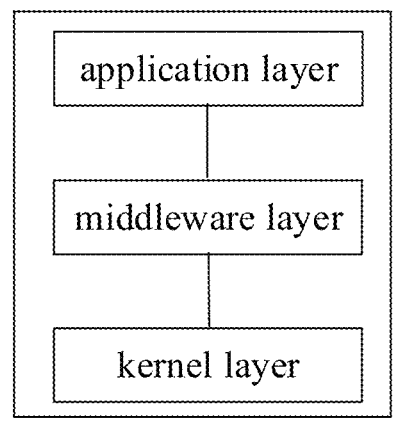
FIG. 4 is a block diagram of architecture configuration of an operating system in a memory of a display apparatus 200 according to some embodiments of the present application.

FIG. 4 illustrates a block diagram of architecture configuration of an operating system in a memory of a display apparatus 200. The architecture of the operating system includes an application layer, a frame layer, a middleware layer and a kernel layer from top to bottom.

Specific configuration descriptions related to the display apparatus 200 refers to a priority document of the Chinese patent application No. 202010176801.9 filed on Mar. 13, 2020.

Figure 5:
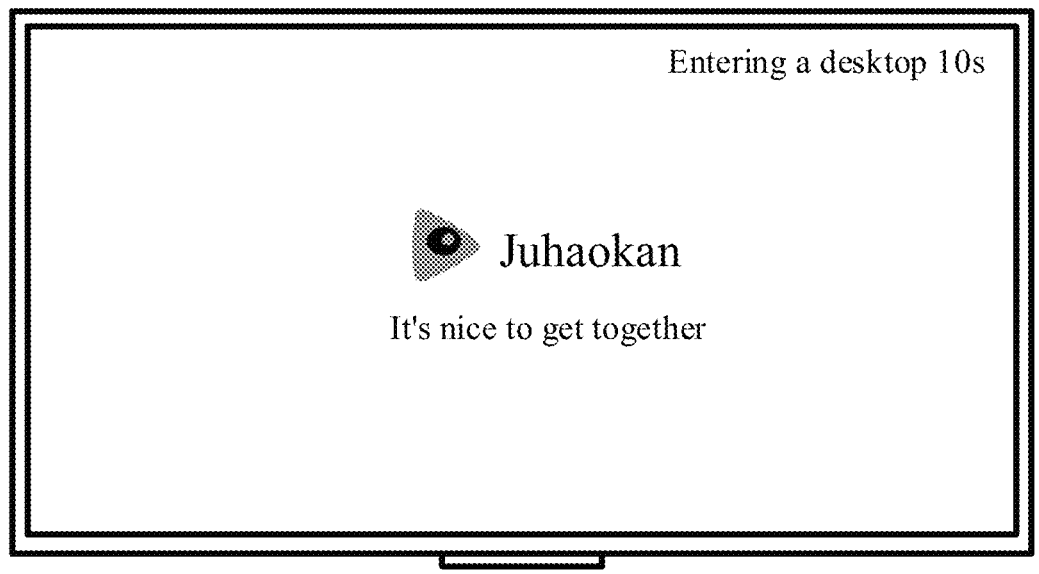
FIG. 5 is a schematic diagram of an animation during starting in a horizontal state according to some embodiments of the present application.
Figure 6:
FIG. 6 is a schematic diagram of an animation during starting in a portrait state according to some embodiments of the present application.

FIG. 5 is a schematic diagram of an animation during starting in a horizontal state according to some embodiments of the present application. FIG. 6 is a schematic diagram of an animation in a portrait state according to some embodiments of the present application. The animation shown on a display 275 may be a predefined transition picture built in the operating system, and may also be a third-party video resource shown on a display apparatus 200 for commercial purposes. For example, the animation may be video recommended resources such as a trailer pushed from a server according to user preferences, or an advertisement video resource.

An animation resource file may be stored in a memory 260 of the display apparatus 200. When a starting program is run, the animation resource file is directly called from the memory 260 of the display apparatus 200. The memory 260 may obtain a plurality of animation resources from a server 300 (or a network environment) through a background program in a normal running process of the display apparatus 200, so as to be displayed for different starting moments. That is, the animations for each time of starting are different, and a monotonic display effect is avoided. The animation resource file may further be obtained from the server 300 in real time after the starting program is started, so as to reduce storing space of the memory 260.

When the animation resource is obtained from the server 300 in real time, the display apparatus 200 needs to be in a network state. However, because the display apparatus 200 is just started and run, the network environment may possibly be unstable, or the resource file cannot be downloaded from the server 300 in time, causing unsmooth page transition or long waiting time. Therefore, in order to make the starting page in smoother transition, a backup animation resource may be stored in the memory 260. When the resource file cannot be loaded in a predetermined time in the starting process, the backup starting animation resource may be called. In this way, the memory 260 does not need to store excessive resource files, and it may also be ensured that the different pictures are displayed during starting each time.

The animations presented are different for different states of the display 275. The difference may lie in the different contents or the different display scales of animation resources. For example, when the display 275 is in the landscape state, the animation in a horizontal form such as a movie trailer and a regular advertisement may be selected to be played. When the display 275 is in the portrait state, the animation in a vertical form such as a short video APP image may be selected to be played.

The landscape state refers to a state that when watching from a front side of the display 275, a length (width) of the display 275 in a horizontal direction is greater than a length (height) in a vertical direction. The portrait state refers to a state that when watching from the front side of the display 275, the length (width) of the display 275 in the horizontal direction is smaller than the length (height) in the vertical direction. Obviously, considering an installation/placing position of the display apparatus 200, the vertical direction in the present application refers to be roughly vertical, and the horizontal direction also refers to be roughly horizontal. The landscape state is mainly configured to display horizontal media resources such as a teleplay and a movie, and the portrait state is mainly configured to display vertical media resources such as a short video and a cartoon.

It should be noted that the above landscape state and portrait state are only the two different display states, and do not limit the displayed content. For example, the vertical media resources such as the short video and the cartoon may still be displayed under the landscape state, the horizontal media resources such as the teleplay and the movie may still be displayed under the portrait state, and only inconsistent display windows need to be compressed and adjusted under this state.

A state that the display 275 is in during starting generally depends on a state of the display 275 in a previous user by the user. For example, when the user turns off the display apparatus 200 last time, the display 275 is in the landscape state, and thus the display 275 is also in the landscape state during starting this time. In a similar way, when the user turns off the display apparatus 200 last time, the display 275 is in the portrait state, and thus the display 275 is in the portrait state during starting this time.

Obviously, as for the rotatable display apparatus 200, the posture of the display 275 is not limited to the above two cases. The display 275 may further be in other postures according to the different uses. For example, the display 275 is rotated to other predetermined tilt state through the rotating assembly 276; or in a process that the user rotates the display 275 last time, the display 275 is in the tilt state due to power failure or other failures; or the display apparatus 200 is manually rotated to the tilt state during turned off. In the present application, the postures of the display 275 are all called the rotation state. The rotation state further includes a standard state and a nonstandard state.

The standard state refers to a state that may be obtained directly by adjusting through the rotating assembly 276 according to a video watching need of the user, and may include the landscape state, the portrait state, etc. The standard state may further include other adjustable states, such as a state of tilting by 45 degrees according to a display need. The nonstandard state is different from the standard state, and may be any intermediate state in a switching process of the display 275 between the two standard states. For example, when the user issues a command of switching from the landscape state to the portrait state through the control device 100, the rotating assembly 276 drives the display 275 to rotate, and thus in a process not reaching the portrait state, the posture that the display 275 is in is the intermediate state. In this case, if the display 275 stays at any intermediate state due to power failure or other failures, the display 275 is in a nonstandard state.

When the display 275 is in the nonstandard state, the display 275 is usually in a tilt state. In this state, a picture displayed on the display 275 is also tilted, consequently, a viewing experience of the user is affected, and abnormality is also prone to occurring when the display 275 selects the resource. For example, when the display 275 clockwise rotates by more than 45 degrees from the landscape state and then stops, the display 275 is closer to the portrait state. In this case, when the display 275 displays according to the landscape state, the display picture is tilted greatly, and the viewing experience of the user is seriously affected. Moreover, the rotatable display apparatus 200 internally and generally detects the tilt state of the display 275 through a gravity acceleration sensor, so as to adjust a played picture. For example, when the display 275 is closer to the portrait state, the display 275 may anticlockwise rotate the display picture by 90 degrees, so as to adapt the portrait state.

In a starting process, some programs of the control system is not started completely, the display picture cannot be adjusted through a picture adjusting program, and therefore, above rotation cannot be performed on the animation in the starting process. In order to improve a display quality of the animation during starting, in the present application, the different animations may be displayed when the display 275 is in different rotation states.

Figure 7:
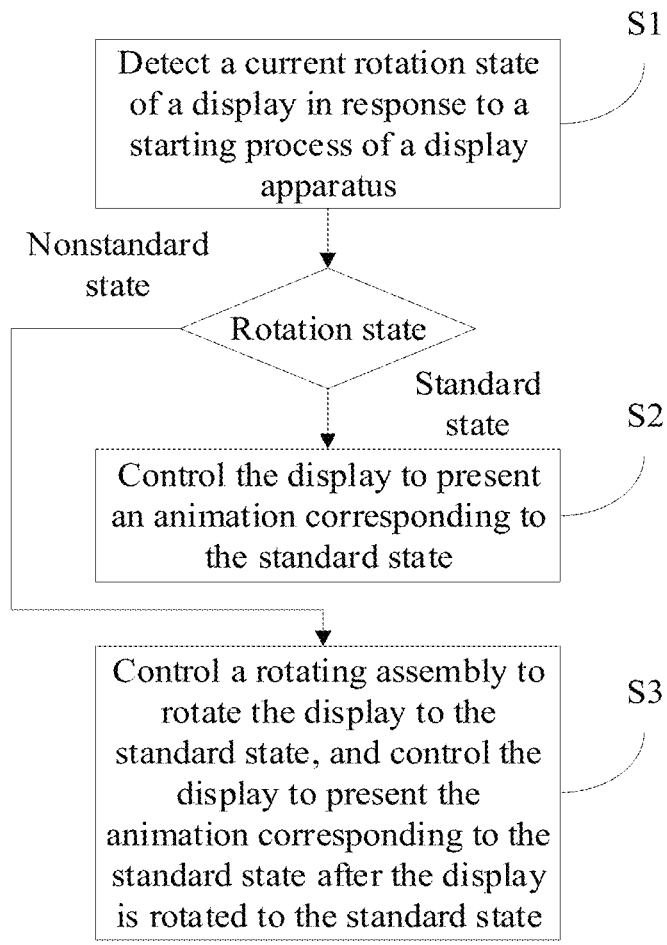
FIG. 7 is a schematic flow chart of a method for starting a display apparatus according to some embodiments of the present application.

As shown in FIG. 7, a starting method according to the present application may specifically include the following operations.

That is, a controller is configured to: detect a current rotation state of a display in response to a starting process of a display apparatus (S1).

In some embodiments, the display apparatus is in an off state, after a user starts the display apparatus 200 through a control device 100, such as a power key, voice or gesture input for the display apparatus 200, the controller 250 may detect the rotation state of the display 275 in response to a starting instruction from the user. The specific method for detecting the rotation state includes: performing a gravity direction detection via a gravity acceleration sensor built in the display apparatus 200, or detecting a current rotating angle of a rotating assembly 276.

As for measuring through the gravity acceleration sensor, after the display apparatus 200 begins to start, the controller 250 may acquire a gravity acceleration direction sensed by the gravity acceleration sensor, that is, a vertical direction is determined; and then the controller 250 determines the rotation state that the current display 275 is in by determining a position relationship between the display 275 and the gravity acceleration direction. For example, if it is detected that the gravity acceleration direction is parallel to a short side direction of the display 275, the current display 275 is under the landscape state in the standard state; if it is detected that the gravity acceleration direction is parallel to a long side direction of the display 275, the current display 275 is under the portrait state in the standard state; and if it is detected that the gravity acceleration direction is neither parallel to the long side direction nor parallel to the short side direction of the display 275, the current display 275 is in the nonstandard state.

As for the detecting through the rotating assembly 276, after the display apparatus 200 begins to start, the controller 250 may detect a rotating angle of the rotating assembly 276, so as to obtain the rotation state of the display 275. For example, the rotating assembly 276 is an initial 0-degree angle when the display 275 is in the landscape state. When a rotating angle of the current rotating assembly 276 is obtained to be 0 degree by detecting the rotating angle of the rotating assembly 276, it is determined that the display 275 is in the landscape state. When the rotating angle of the current rotating assembly 276 is obtained to be +90 degrees by detecting the rotating angle of the rotating assembly 276, it is determined that the display 275 is in the portrait state.

When the rotating angle of the current rotating assembly 276 is determined to be 36 degrees by detecting the rotating angle of the rotating assembly 276, it is determined that the display 275 is in the nonstandard state.

The landscape state and the portrait state in the present application are relative direction (it is assumed that a relative 0 degree coincides with an absolute 0 degree) that may be set by the user, and are not absolute direction. For example, in some scenarios, when the user sets that the display is in a relative landscape state when being in 45 degrees, the display 275 may display picture in a mode of tilting by 45 degrees, and therefore, a posture that the display 275 is in the 45-degree tilt direction may also serve as the standard state. Accordingly, along with motion of the rotating assembly 276, the display 275 may rotate clockwise or anticlockwise. That is, the state of tilting by 45 degrees may include a +45 degree rotation state and a −45 degree rotation state. Further, the portrait state includes a +90 degree rotation state and a −90 degree rotation state relative to the landscape state.

The controller is further configured to control the display to present an animation corresponding to the standard state in response to the display being in the standard state (S2).

After the current rotation state of the display 275 is detected, the controller 250 may control to display the animation according to the detected rotation state. When the display 275 is in the standard state, that is, the display 275 is in the landscape state or the portrait state, the display 275 is controlled to display the corresponding animation.

Figure 8:
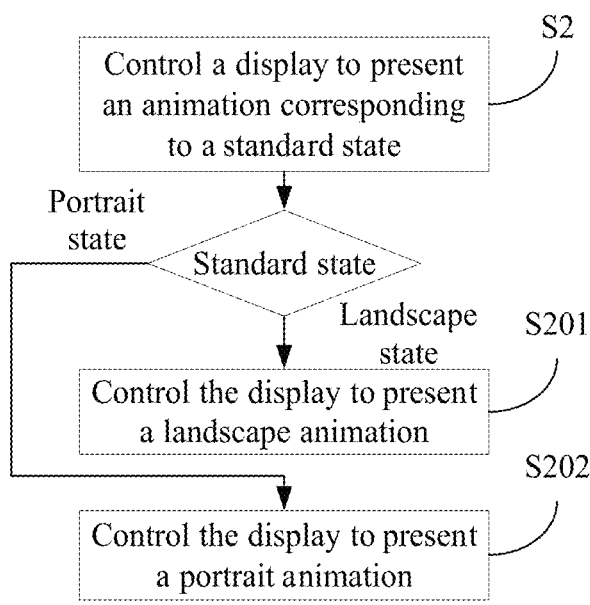
FIG. 8 is a schematic flow chart of a method for starting a display apparatus in a standard state according to some embodiments of the present application.
Figure 9:
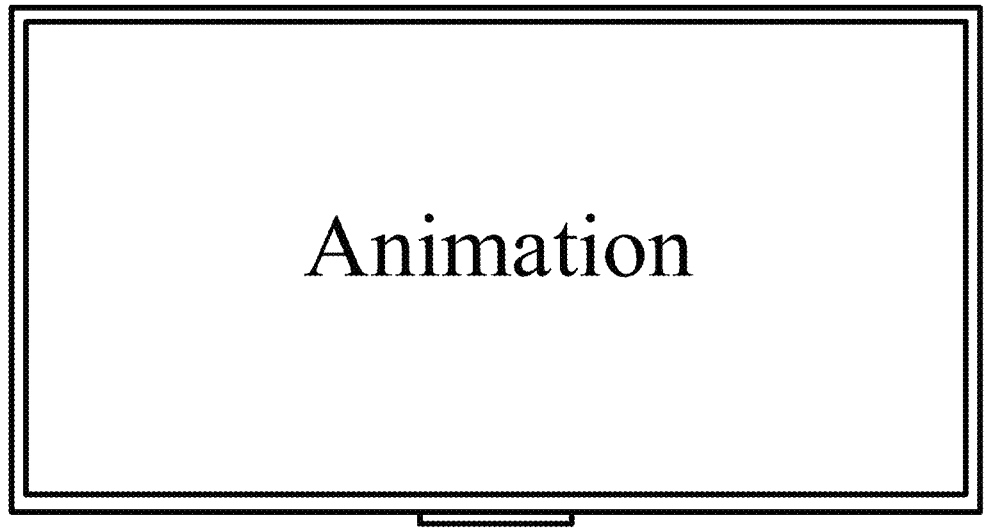
FIG. 9 is a schematic diagram of a display apparatus in a nonstandard state according to some embodiments of the present application.

As shown in FIG. 8-FIG. 9, in response to the display being in the standard state, the controller is further configured to: control the display to present a landscape animation in response to the display being in the landscape state (S201); and control the display to present a portrait animation in response to the display being in the portrait state (S202).

The landscape animation and the portrait animation are different. In the landscape state, a size of the displayed animation is consistent with a display scale of the display 275 under the landscape state, and meanwhile, a type of the animation is also adaptive to landscape media resources played by the current display 275 in the landscape state. For example, when the display 275 is in the landscape state, an aspect ratio of the display picture of the display 275 is 16:9, and the controller 250 controls the display 275 to present a trailer of a movie and a teleplay with the aspect ratio being also 16:9 to serve as the starting animation. In a similar way, under the portrait state, an aspect ratio of the display picture of the display 275 is 9:16, and the controller 250 controls the display 275 to present short video clips with the aspect ratio being also 9:16 to serve as the starting animation.

The controller is further configured to control a rotating assembly to rotate the display to the standard state in response to the display being in the nonstandard state, and control the display to present the animation corresponding to the standard state after the display is rotated to the standard state (S3).

When the display 275 is in the nonstandard state, the controller 250 may send an instruction to the rotating assembly 276, so that the rotating assembly 276 may drive the display 275 to rotate to a standard state firstly. After the display 275 is rotated to the standard state, the display 275 is controlled to present the starting animation corresponding to the standard state.

For example, when the controller 250 detects that the rotating angle of the rotating assembly 276 is +30 degrees (which is a nonstandard state and can be obtained by clockwise rotating by 30 degrees relative to the landscape state), it is determined that the rotation state that the display 275 is currently in is the nonstandard state. In this case, the rotating assembly 276 may be controlled to rotate according to a rotating direction last time, thus the display 275 is rotated by −30 degrees (anticlockwise rotating by 30 degrees) or +60 degrees (clockwise rotating by 60 degrees), so that the display 275 is in the landscape state. In the rotating process, the display may be in a blank screen state. After the display 275 is adjusted to be the landscape state, the animation such as the trailers of the movie and the teleplay with the aspect ratio being also 16:9 is presented in the display 275.

It can be seen that when the display apparatus 200 of the present application begins to start, the controller 250 determines the rotation state of the display 275, and display the different animations according to the rotation state. When the display 275 is in the landscape state, the animation adaptive to the landscape state is displayed. When the display 275 is in the portrait state, the animation adaptive to the portrait state is displayed. When the display 275 is the nonstandard state, the display 275 may be rotated to the standard state firstly, and then the corresponding animation is displayed, so that the user feels that the animation and the posture of the display 275 are matched all the time, thereby improving user's experience.

In the above embodiments, if the display 275 is in a nonstandard state, the display 275 needs to be rotated to the standard state firstly. The standard state includes but is not limited to the two or more states of the landscape state and the portrait state. Therefore, in the process of rotating the display 275 to the standard state, it needs to be determined which standard state is the display 275 adjusted. For example, the landscape state of the display 275 serves as an initial state, which may be set as a default state. When it is detected that the display 275 is in a nonstandard state during starting, the display 275 may be rotated to the landscape state through the rotating assembly 276, so as to display the animation corresponding to the landscape state.

Figure 10:
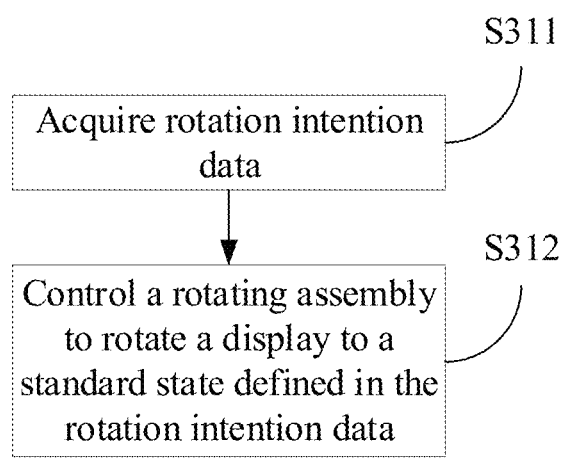
FIG. 10 is a schematic flow chart of adjusting a rotating state of a display according to rotation intention data according to some embodiments of the present application.

In some implementations, because the display 275 is in the nonstandard state, due to accidental power failure or other reasons when switching occurs between the landscape and portrait state, the rotating assembly 276 stops rotation. Therefore, the state that the display 275 needs to be rotated may be determined according to rotation intent during the landscape and portrait state in previous switching. That is, as shown in FIG. 10, if the display 275 is in the nonstandard state, the controller is further configured to: acquire rotation intention data (S311).

The rotation intention data is a rotation state adjusting instruction recorded when the display apparatus 200 is turned off last time. The rotation intention data may be recorded in a buffer built of the display apparatus 200, and specifically may be an instruction for adjusting rotation state in the buffer. The instruction is an instruction configured to control rotating of the rotating assembly 276, may be manually issued from the user through the control device 100, or may be automatically generated by the controller 250 according to a picture display state. The rotation intention data may further be obtained from a driving motor of the rotating assembly 276. For example, a rotated angle and a to-be-rotated angle at a motor end are obtained, so as to determine the rotation intention of the user.

The controller is further configured to control a rotating assembly to rotate a display to a standard state defined in the rotation intention data (S312).

After obtaining the rotation intention data, the controller 250 may read the to-be-rotated state of the rotating assembly 276 from the rotation intention data, so as to continue to control the rotating assembly 276 to rotate according to a current rotation case of the rotating assembly, until the display 275 rotates to a desirable state.

Figure 11:
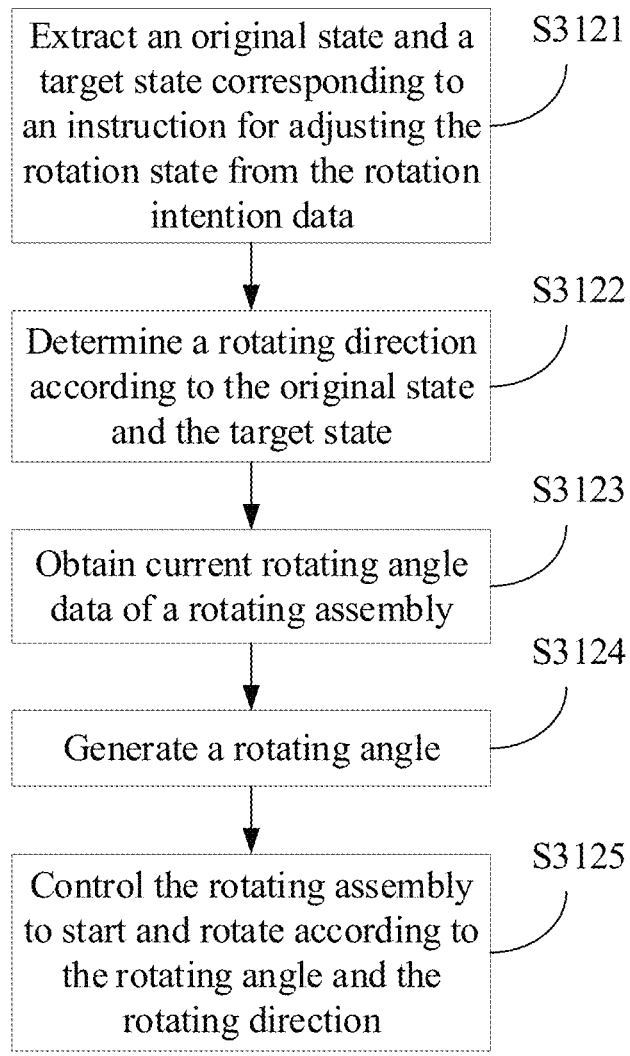
FIG. 11 is a schematic flow chart of controlling a rotating assembly to start rotation according to rotation intention data according to some embodiments of the present application.

That is, as shown in FIG. 11, in some embodiments, the controller 250 is further configured to perform the following operations.

S3121, extract an original state and a target state corresponding to an instruction for adjusting the rotation state from the rotation intention data.

S3122, determine a rotating direction according to the original state and the target state.

S3123, obtain current rotating angle data of a rotating assembly.

S3124, generate a rotating angle.

S3125, control the rotating assembly to start and rotate according to the rotating angle and the rotating direction.

In order to control the rotating assembly 276 to rotate the display 275 to the standard state predetermined in the rotation intention data, the controller 250 may extract information in the rotation intention data firstly, so as to determine the original state and target state in the previous rotating and adjusting processes of the user. Obviously, the original state and the target state are the two different standard states. For example, the original state and the target state are the landscape state and the portrait state respectively, that is, the previous instruction for adjusting a rotation state from the user is to adjust the display 275 from the landscape state to the portrait state.

Further, if the standard state of the display 275 of the display apparatus 200 has multiple cases, the original state and the target state may further be determined. For example, when the previous instruction for adjusting rotation state from the user is to clockwise adjust the display 275 from the landscape state to the portrait state, the original state and the target state are the landscape state and the +90 portrait state respectively.

After the original state and the target state are determined, a rotating direction, of the rotating assembly 276 may be determined according to a position relationship corresponding to the original state and the target state, namely, the rotating direction. Meanwhile, the controller 250 may further extract current rotating angle data of the rotating assembly 276, that is, the rotated angle of the rotating assembly 276 in the previous rotating process. The rotating angle of the rotating assembly 276 is determined according to an angle difference calculated by the current rotating angle data and the target state, and thus the rotating assembly 276 is controlled to start to rotate according to the rotating angle and the rotating direction.

For example, the rotating angle that the display 275 is currently in is +30 degrees relative to the horizontal state, that is, the display 275 is in the nonstandard state. The controller 250 needs to obtain the rotation intention data, and thus the recorded instruction for adjusting rotation state obtained by the controller 250 through the buffer of the display apparatus 200 is to clockwise rotate the display 275 from the landscape state to the portrait state. In this case, it may be determined that in the previous rotating process of the display 275, the original state is the landscape state, the target state is the portrait state, and the rotating angle is +90 degrees. Therefore, a control instruction may be sent to the rotating assembly 276 for instructing the rotating assembly 276 to clockwise rotate by 60 degrees, so that the display 275 will reach the portrait state.

In the above embodiment, after the display apparatus 200 is started, the controller 250 may detect a current rotation state of the display 275, which is a state of the display currently in. When the display 275 is in the nonstandard state, the rotation intention in the previous use of the user may be determined firstly through the rotation intention data recorded by the display apparatus 200, then the display 275 is rotated to the standard state corresponding to the rotation intention, the corresponding animation is displayed according to the standard state after rotation, so that the animation and the posture of the display 275 are kept consistent, thereby improving user's experience.

Figure 12:
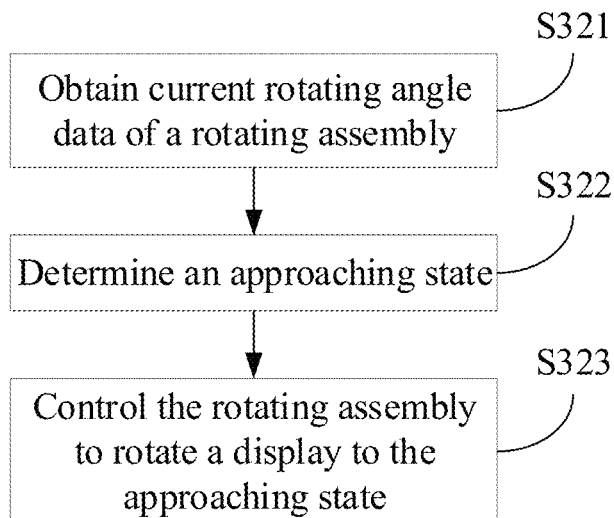
FIG. 12 is a schematic flow chart of adjusting a rotation state of a display based on an approaching state according to some embodiments of the present application.

However, in some cases, the buffer of the display apparatus 200 may not record the rotation intention data in the previous rotation process, for example, data stored in the buffer are lost or damaged due to power failure or other failures. Or the nonstandard state that the display 275 is in is not caused by a rotating operation. For example, the display 275 is manually rotated during power off state, so that the display 275 is in a tilt state. In these cases, the controller 250 can not obtain the recorded rotation intention data from the buffer of the display apparatus. However, the display 275 is also in the nonstandard state after being started. Therefore, as shown FIG. 12, if the rotation intention data are not obtained, the controller is further configured to perform the following operations.

S321, obtain current rotating angle data of a rotating assembly.

In some embodiments, if the rotation intention data cannot be obtained from the buffer of the display apparatus 200, the controller 250 directly obtains the current rotating angle data of the rotating assembly 276, that is, determining how many angles the rotating assembly 276 is rotated is relative to a 0-degree angle. For example, the state that the rotating assembly 276 is in during the landscape state of the display 275 is the 0-degree angle, after being started, the controller 250 detects that the rotating assembly 276 clockwise rotates by 65 degrees relative to the 0-degree angle, and the current rotating angle data are +65 degrees.

S322, determine an approaching state.

After obtaining the current rotating angle data of the rotating assembly 276, a standard state having a minimum angle difference with the current rotating angle data may be determined as the approaching state. For example, the current rotating angle data are +65 degrees, while the standard state of the display 275 includes: the landscape state (0 degree), +90 degree portrait state and −90 degree portrait state. The angle difference between the landscape state and the current rotating angle data is 60 degrees; an angle difference between the +90 degree portrait state and the current rotating angle data is 25 degrees; and an angle difference between the −90 degree portrait state and the current rotating angle data is 155 degrees. It can be seen that the standard state having the minimum angle difference with the current rotating angle data is the +90 degree portrait state, and thus it is determined that the approaching state is the +90 degree portrait state.

S323, control the rotating assembly to rotate a display to the approaching state.

After the approaching state is determined, the controller 250 may generate a control signal according to the angle difference between the approaching state and the current rotating angle data, and sends the control signal to the driving motor in the rotating assembly 276, so as to control the rotating assembly 276 to rotate the display 275 to the approaching state. For example, the current rotating angle data are +65 degrees, the approaching state is the +90 degree portrait state, the angle difference between the approach state and the current rotating angle data is 25 degrees, and thus the controller 250 generates the control signal for indicating the rotating assembly 276 to drive the display 275 to clockwise rotate by 25 degrees, and send the control signal to the rotating assembly 276 to start and rotate.

It should be noted that in a process of controlling the rotating assembly 276 to rotate the display 275 to the approaching state, the rotating direction of the rotating assembly 276 may further be determined according to the position relationship between the current rotating angle data and the approaching state, so that the rotating assembly 276 may rotate the display 275 to the approaching state as soon as possible. For example, the current rotating angle data are 23 degrees, the approaching state is the landscape or horizontal state, the display 275 needs to anticlockwise rotate by 23 degrees to reach the landscape state, and thus the controller 250 generates a control signal for indicating the rotating assembly 276 to drive the display 275 to clockwise rotate by 23 degrees, and send the control signal to the rotating assembly 276 to start and rotate.

Figure 13:
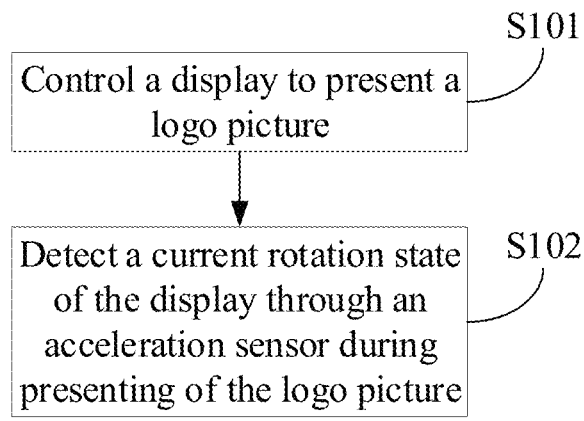
FIG. 13 is a schematic flow chart of displaying a Logo picture according to some embodiments of the present application.

In one implementation, the display apparatus 200 further includes an acceleration sensor, and the acceleration sensor is connected with the controller 250. As shown in FIG. 13, in response to starting of the display apparatus 200 and before playing the animation, the controller 250 is further configured to perform the following operations.

S101, control the display to present a logo picture.

S102, detect a current rotation state of the display through an acceleration sensor during presenting of the logo picture.

The logo picture is a first picture displayed by the display 275 after the display apparatus 200 is being started, and may include a brand logo of the display apparatus 200. As shown in FIG. 9, in order to adapt various different rotation states, the logo picture may be as simple as possible, for example, the edges are pure color, and only the logo image is displayed in a middle region. Moreover, the logo image presented in the middle may keep the basically consistent display effect in the different rotation states, so as to provide a visually full image display effect for the user.

During displaying of the logo picture, as the control system is starting, the controller 250 may further detect the current rotation state of the display 275 through the acceleration sensor. The acceleration sensor may sense the gravity direction, so as to determine the posture of the display 275. For example, when it is detected that a difference between the gravity direction and a short side of the display 275 is 30 degrees through the acceleration sensor, it is determined that the current display 275 clockwise rotates by 30 degrees relative to an initial landscape state. That is, the current display 275 is in the nonstandard state and needs to be adjusted, for example, after clockwise rotating by 60 degrees or anticlockwise rotating by 30 degrees, the display 275 will reach a standard state (the portrait state or the horizontal state), and then the animation is displayed in the standard state.

In some other embodiments, during displaying of the logo picture, as the control system is being started, the controller 250 may further obtain the current rotation state of the display 275 by reading data information of the rotating assembly.

It can be seen that in the present embodiment, by displaying the logo picture, a certain time may be reserved for detecting the rotation state and generating a corresponding control instruction by the controller 250, so that the display apparatus 200 has a certain transition in a process from boot blank screen to displaying of the animation. In addition, a display duration of the logo picture may be fixed, or may also be dynamically adjusted according to a program execution state of the controller 250. That is, in the process that the controller 250 determines the rotation state and determines an animation program for playing, the display 275 presents the logo picture all the time till the animation is ready for play.

Figure 14:
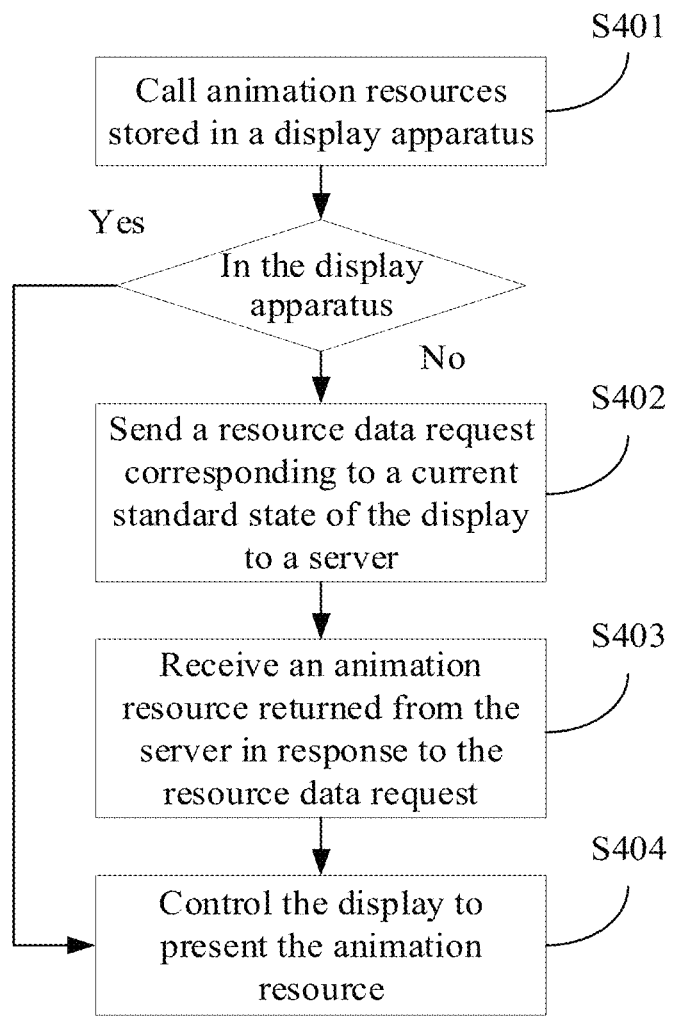
FIG. 14 is a schematic flow chart of invoking an animation resource according to some embodiments of the present application.

In order to play the animation adaptive to the rotation state of the display 275 currently in, an animation resource file may be stored in a memory 260 of the display apparatus 200. However, in order to reduce storage resource, the memory 260 of the display apparatus 200 cannot store many animation resources, therefore, in some cases, some animation resources corresponding to some rotation states cannot be obtained from the memory 260 of the display apparatus 200. Therefore, in some embodiments as shown in FIG. 14, in the step of controlling the display 275 to present the animation corresponding to the standard state, the controller 250 is further configured to perform the following operations.

S401, call animation resources stored in a display apparatus.

S402, in response to no animation resource adaptive to the current standard state in the display apparatus, send a resource data request corresponding to a current standard state of the display to a server.

S403, receive an animation resource returned from the server in response to the resource data request.

S404, control the display to present the animation resource.

After determining the rotation state of the display 275 currently in or after determining a current rotation state of the display 275, the controller 250 may call the animation resources adaptive to the current rotation state from the memory of the display apparatus 200. For example, during starting, the display 275 is in the landscape state, thus the controller 250 needs to call the animation resources in the landscape form from the memory of the display apparatus 200, so as to be played in the display 275.

But if the animation resources adaptive to the current standard state can not be obtained from the memory 260 of the display apparatus 200, the resource data request may be sent to the server 300, so as to obtain the animation resources. For example, during starting, the display 275 is in the portrait state, while the memory 260 of the display apparatus 200 does not store the portrait animation resource, in this case, the controller 250 may send the resource data request to the server 300, so as to request for portrait animation resource data. The server 300 receives the resource data request, and then may return the animation resource to the display apparatus 200 in response to the resource data request. After receiving the animation resource returned, the controller 250 may decode the animation resource, so as to control the display 275 to present the animation resource.

It can be seen that in the present embodiments, there may be no need to store many animation resource files in the memory 260 of the display apparatus 200, thereby reducing storage space of the display apparatus 200. Meanwhile, because the animation is short in duration and a resource data packet is relatively small in size, the animation resource may be obtained without waiting for a long time by the user in the present embodiments, so that the animation played each time is not repeated, and the user experience is improved.

Figure 15:
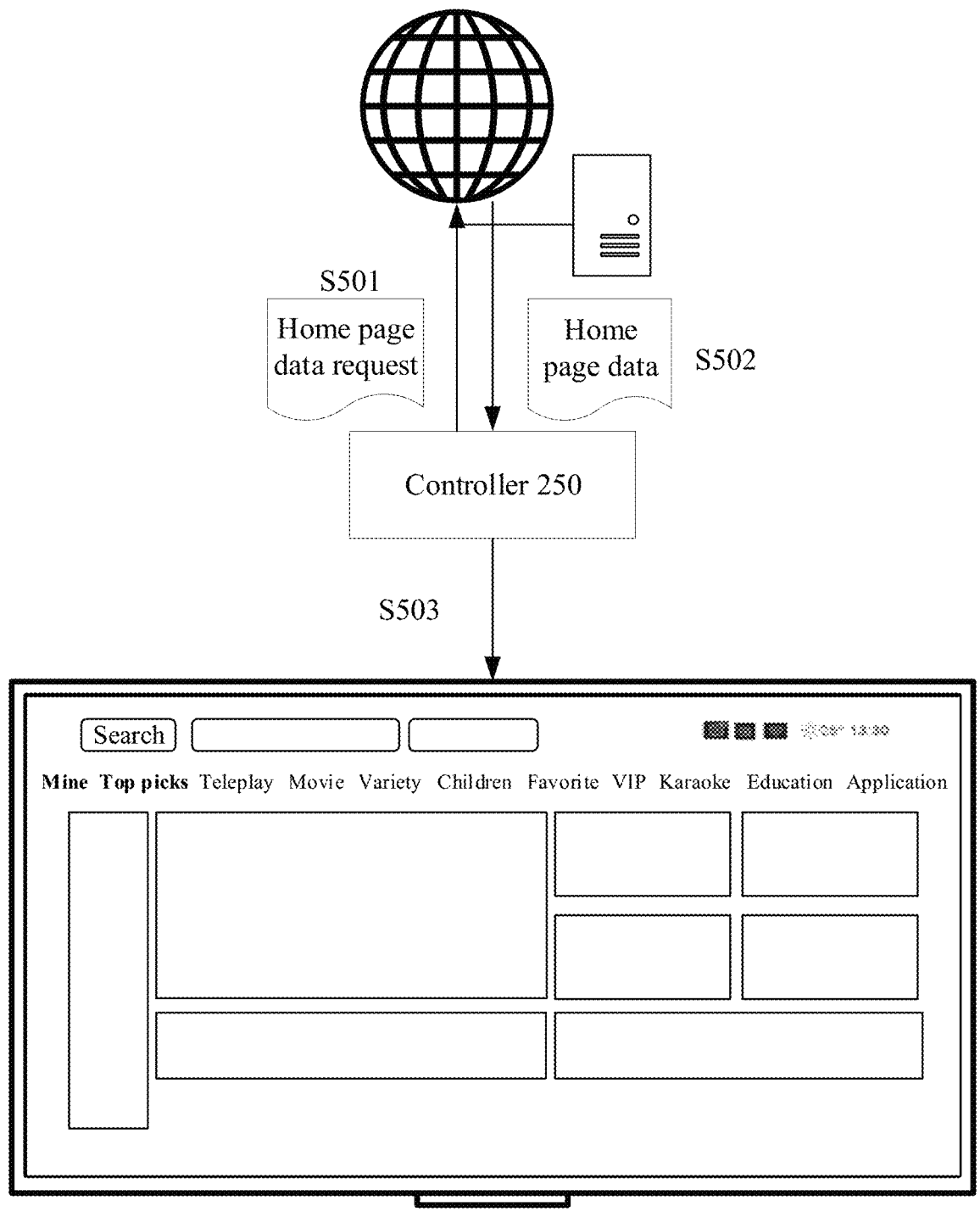
FIG. 15 is a schematic flow chart of controlling a display to present a home page according to some embodiments of the present application.

In one implementation, as shown in FIG. 15, after controlling the display to present the animation corresponding to the standard state, the controller is further configured to perform the following operations.

S501, send a home page data request corresponding to a current standard state of the display to the server.

S502, receive home page data returned from the server in response to the home page data request.

S503, control the display to present a home page according to the home page data.

In some other implementations, the controller has begun to request the home page data from the server when controlling the display to present the animation. Before the animation completes displaying, home page displaying is ready, so that a home page may be directly entered after the animation ends.

Figure 16A:
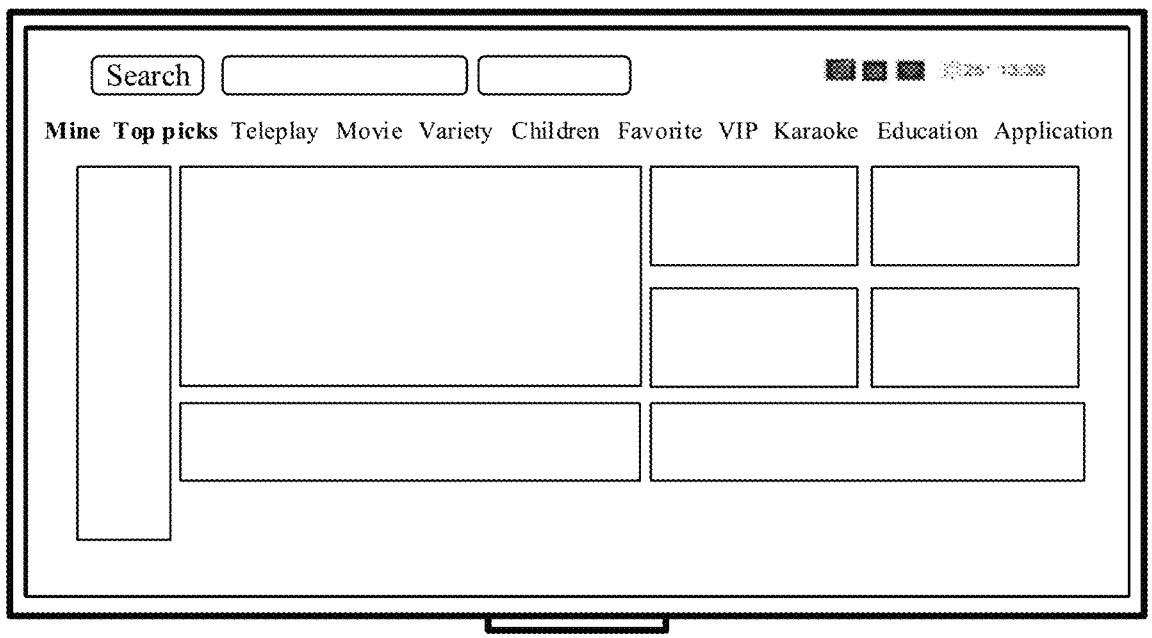
FIG. 16A is a schematic diagram of a landscape home page according to some embodiments of the present application.
Figure 16B:
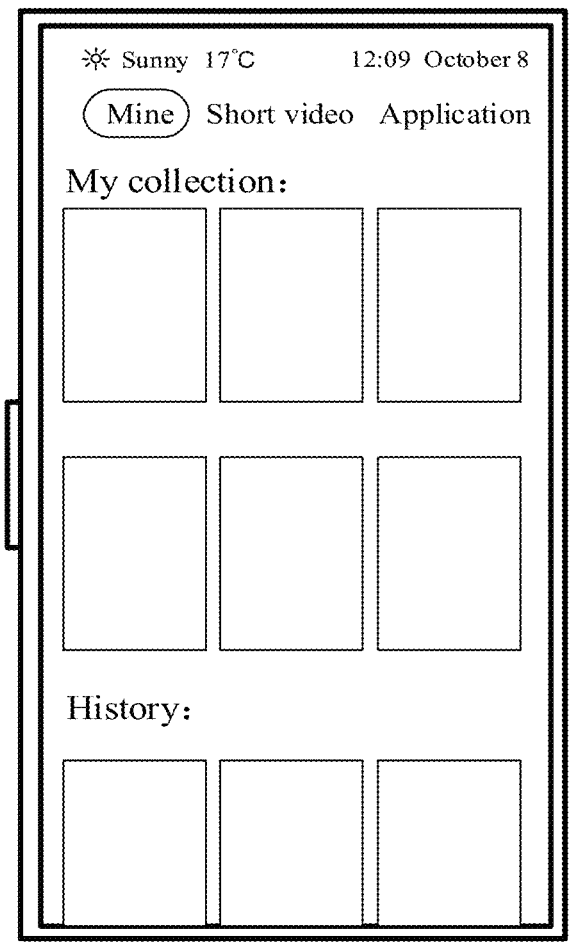
FIG. 16B is a schematic diagram of a portrait home page according to some embodiments of the present application.

After the display 275 presents the animation, a starting program of the operating system is basically run as well. In this case, a UI needs to be displayed on the display 275, so that the user performs an interaction operation and watches a film normally. Because the display 275 may be in the various rotation states, the UI may display the different home pages. In the landscape state, the display 275 is supposed to display a landscape home page adaptive to the landscape state. For example, as shown in FIG. 16A, the control interface is displayed in the landscape form, and the movie resources displayed on the page may also be landscape media resources such as the movie and the teleplay. In a similar way, in the portrait state, the display 275 should display a portrait home page adaptive to the portrait state. For example, as shown in FIG. 16B, the control interface is displayed in the portrait form, and the movie resources displayed on the page may also be portrait media resources such as the short video and the cartoon.

In order to adapt to the different rotation states of the display 275, during display process of the animation (or after), the controller 250 needs to send the home page data request corresponding to a current standard state of the display 275 to the server 300. After the server 300 receives the home page data request, home page data may be fed back to the display apparatus 200 according to the rotation state designated in the request. The home page data may include a media resource cover and a link file displayed in the home page, and may further include data for arrangement of home page content.

After the controller 250 receives the home page data fed back from the server 300 in response to the home page data request, the home page data may further be parsed, so that the home page data are combined with a corresponding UI for a rotating posture, and the display 275 is controlled to present the corresponding home page according to the home page data. For example, during starting of the display apparatus 200, it is detected that the current display 275 is in the landscape state, an interface of the server 300 is requested to be called, and a request for obtaining the landscape home page data is sent to the server 300. The server 300 responds to the request and issue the landscape home page data to the controller 250. The controller 250 recognizes the landscape home page data, and controls the display 275 to present the landscape home page according to the landscape home page data.

In some implementations, after the animation completes displaying, home page information requested from the server 300 is displayed, and a content from a signal source may further be displayed. A rotatable television supports many applications. In order to facilitate user watching, a signal source of the television may be designated by setting a signal source when starting. For example, in order to obtain a viewing experience of a traditional television, the signal source of the television may be set to be a live broadcast signal, so that the television directly enters into a live broadcast source after being started. Because the different applications support the different display postures, the posture of the television during starting should be adaptive to the application serving as the signal source when starting, and thus the picture corresponding to the signal source application may be normally displayed.

In the present application, the signal source for starting or the starting signal source is a display mode set for the display apparatus 200 after the animation has been displayed. For example, in order to facilitate users such as the senior citizens or children, the viewing experience of the traditional television may be achieved by setting live broadcast as a default signal source on the display apparatus 200. In this case, a live broadcast television signal may be directly entered after the animation playing is finished.

Generally, during the playing of the animation, the preparation of the signal source is also ongoing, and the animation and the signal source correspond to different threads. In a starting process of the signal source, because the landscape state and the portrait state are different, the different modes also need to be displayed according to the landscape and portrait states of the display.

The signal source may be an application that is configured to start as default during starting of the display apparatus. For example, HDP live broadcast application and IPTV live broadcast application are set as the signal source when starting, and after the display apparatus 200 is started and run, the above applications may be directly started to realize television live broadcast. The signal source for starting may also be a signal source that is defaulted to be connected during starting. For example, the display apparatus 200 is externally connected with a set top box through an HDMI, and the signal source during starting may be set as the HDMI, namely, the set top box. After being started by the user, the display apparatus 200 automatically skips to the display interface provided by the set top box.

In order to set the signal source in starting process, a setting option may be configured in a setting interface of the display apparatus 200, and the user sets a signal source for starting through an interaction operation on the setting interface. For example, in the setting interface, the user may perform interaction operations through the control device 100, like selecting "setting-general-system setting-signal source" in the setting interface to enter a signal source setting interface, and then selecting an "HDP live broadcast" application from the signal source setting interface, that is, the "HDP live broadcast" application is set as the signal source when starting the display apparatus. After setting the signal source for starting of the display apparatus, when the display apparatus is started by the user next time, the "HDP live broadcast" application will be run directly as default, and display the television live broadcast picture.

An operating mode where the display 275 is in the landscape state may be called as a landscape media resource watching mode, and an operating mode where the display 275 is in the portrait state may be called as a portrait media resource watching mode. The controller 250 in the display apparatus 200 is further in communication with the server 300, for calling an interface from the server 300 and obtaining the corresponding data via the interface provided by the server. The display 275 in the display apparatus 200 can be driven to rotate by the rotating assembly 276, and is configured to display a user interface. In some embodiments, the user may control a playing mode, a playing content and the like of the display apparatus 200 through the control device 100. The playing mode includes the landscape media resource watching mode and the portrait media resource watching mode.

The portrait state is mainly configured to display the portrait media resources such as the short video and the cartoon, as shown in FIG. 5B. In the portrait state, the display 275 may display a user interface corresponding to the portrait state, and have an interface layout and an interaction mode corresponding to the portrait state. In the portrait media resource watching mode, the user may watch the portrait media resources such as the short video and the cartoon. In a similar way, because the controller 250 in the display apparatus 200 is further in communication with the server 300, the media resource data corresponding to the portrait state are obtained by calling an interface provided by the server 300 during the portrait state.

It should be noted that the above landscape state and portrait state are only the two different display states, and do not limit the displayed content. For example, the vertical media resources such as the short video and the cartoon may still be displayed in the landscape state, the horizontal media resources such as the teleplay and the movie may still be displayed in the portrait state, and only inconsistent display windows need to be scaled and adjusted to adapt to corresponding states.

When a signal source for the starting of the display apparatus is not set in advance, the control system of the display apparatus 200 may start the signal source through a default starting scheme. For example, the signal source used previous time may serve as the signal source for starting of the display apparatus, namely, the signal source used during previous user of the display apparatus. When the signal source is a signal source in latest previous use, the previous signal source may be further determined. If the previous signal source is physical signal sources such as the live broadcast television and the HDMI, the corresponding physical signal sources may be directly started during starting this time. If the previous signal source is an Android source application, such as a home page and a media center, a home page provided by the operating system is displayed during starting this time.

In addition to UI interaction controls, the home page may further include various media resources for selection and play by the user. For example, the plurality of interaction controls for indicating tabs are arranged at a top region of the home page, such as "top picks", "teleplay", "movie" and "VIP". Upon receiving a selection of an icon from the user, a media resource display region is formed to show a corresponding media resource. For example, upon selecting the icon "movie", the movie media resource is displayed on the bottom region. The different media resources may be displayed with different covers, and therefore, the different layout effects may be obtained by setting the different arrangements at the media resource display region. Obviously, if the signal source application is the Android source application, the corresponding application may also be directly run during starting, rather than always running the control home page.

According to the different rotation states of the display 275, the home pages presented by the display apparatus 200 are also different. For example, in the landscape state, the landscape home page needs to be presented. In the portrait state, the portrait home page needs to be presented. As shown in FIG. 16 A and FIG. 16B, in the landscape home page and the portrait home page, the different UIs and media resource layouts may be presented.

After the signal source is set for the starting of the display apparatus, the operating system of the display apparatus 200 will automatically start a service in the next (or later) starting process, and the service may be configured to be responsible for starting the signal source. In the present application, the service is called a transition service. For example, the signal source for starting is the live broadcast application, when the display apparatus 200 is started, the live broadcast application may be automatically lunched through the transition service, and the automatic starting process is equivalent to or can be regarded as a series of selection actions from a user, like selecting "selected-my application-HDP live broadcast" in order. For another example, the signal source for starting of the display apparatus is the live broadcast signal, when the display apparatus 200 is started, the signal source of the display apparatus 200 may be automatically switched to be connected to the HDMI of the set top box through the transition service, and the automatic starting process is equivalent to interaction operations where the user sequentially selects "selected-signal source-HDMI1".

It should be noted that the above processing mode is only an example of a display processing mode based on the signal source. In other embodiments, there may be various processing manners according to different interactions of the operating system or the display apparatus 200, but for the user, the experience is similar. That is, after setting the signal source for starting, the display apparatus 200 does not display the home page provided by the operating system during starting, but starts the signal source through the transition service, and directly switch the picture displayed on the display 275 to an interface provided by the signal source. Because the user may rotate the display 275, the display 275 may be in the different rotation states during starting each time.

For example, power off or power failure occurs when the user uses the short video, the display 275 is in the portrait state during starting next time. Power off or power failure occurs when the user uses the live broadcast application, the display 275 is in the landscape state during starting next time.

Because the user may be in any application or signal interface in previous use, these applications or signal interfaces may enable the display to be in the landscape state or the portrait state. The signal source for starting set by the user is defaulted to be one of these applications, and therefore, the rotation state supported by the signal source may be not matched with a current rotation state of the display 275 during starting. For example, the user turns off the display apparatus when using a short video application under the portrait state, the rotation state of the display 275 during next starting is the portrait state. If the signal source is set to be the live broadcast application or the live broadcast signal, the signal source is not matched with the current rotation state, and the picture corresponding to the signal source for starting cannot be displayed properly.

It should be noted that the live broadcast picture presented by the live broadcast application has a proportion of 16:9 or 4:3. Therefore, the live broadcast only supports the landscape state, that is, the current signal source only supports the landscape state.

Figure 16C:
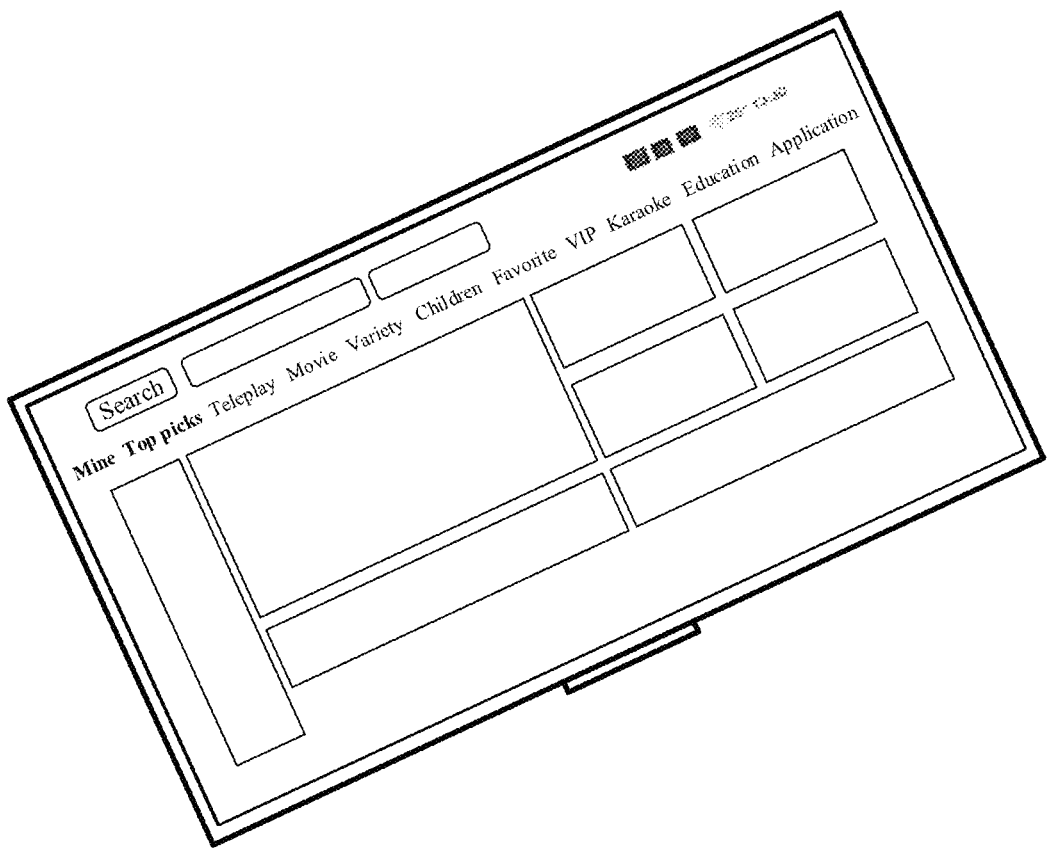
FIG. 16C is a schematic diagram of a rotation-locked state of the present application.

In addition, in some cases, as shown in FIG. 16C, the display 275 may further be in other rotation states after being started. For example, in the process that the display 275 of the display apparatus 200 rotates from the landscape state to the portrait state, due to sudden power failure, foreign matter blocking, manual blocking and other reasons, the display 275 is in an intermediate state in a process of switching from the landscape state to the portrait state. The intermediate state is an abnormal state, and is called a rotation-locked state. Obviously, the display 275 is in the tilt state under the rotation-locked state, which will influence the view experience of the user. Therefore, when the display 275 is in the rotation-locked state or blocked state, it also belongs to a case that the signal source is not matched with the current rotation state.

Figure 17:
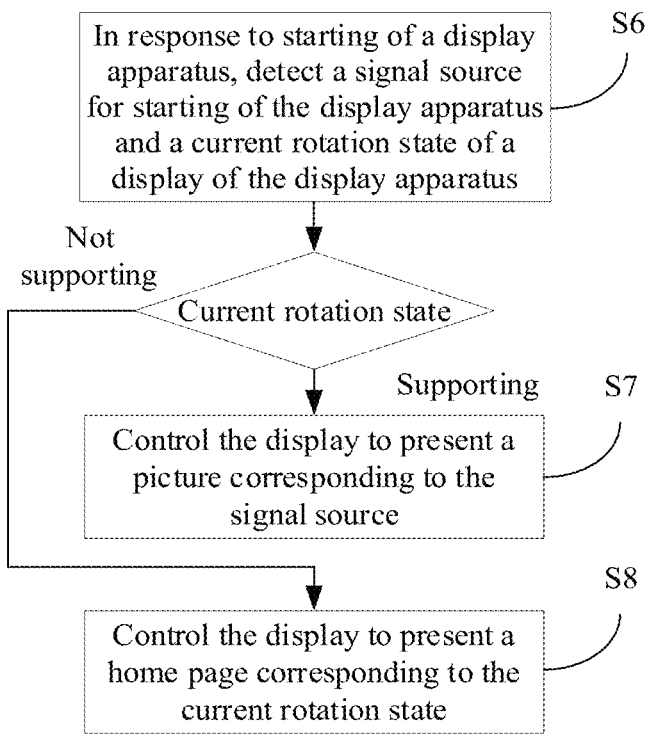
FIG. 17 is a schematic flow chart of a display method for adapting a signal source during starting according to some embodiments of the present application.

In order to achieve display adaptation for the starting signal source, the present application provides a display apparatus 200. As shown in FIG. 17, a controller 250 of the display apparatus 200 is configured to perform the following operations.

S6, in response to starting of a display apparatus, detect a signal source for starting of the display apparatus and a current rotation state of a display of the display apparatus.

The starting process of the display apparatus 200 mainly includes the following steps; first, the display apparatus 200 is overall provided power, causing the display apparatus 200 to enter a standby state; second, upon receiving a starting instruction from a user via pressing a power key on a control device 100 or a physical/touch button on the display apparatus 200, an operating system is started to run; then, a controller 250 gradually enters the operating system of the display apparatus 200 by executing programs relevant to starting of the operating system, and a brand LOGO and/or an animation may be presented on a display 275 during this period; and finally, after all control programs relevant to starting of the operating system are run, a watching mode is entered.

In the starting process of the display apparatus 200, the controller 250 may read a signal source for starting set by a user by executing a starting-related program, so as to determine a rotation state supported by the starting a signal source. For example, by reading the signal source, it is determined that the signal source set by the user is a live broadcast application. While the signal source set for starting process is being detected, the controller 250 is further configured to obtain a current rotation state of the display 275.

S7, control the display to present a picture corresponding to the signal source in response to the signal source supporting the current rotation state.

After the signal source and the current rotation state of the display 275 are detected, the controller 250 may further determine whether the signal source set for the starting process supports the current rotation state by executing a control program, so as to control the picture shown on the display 275.

For example, by analyzing posture data measured by an attitude sensor, it may be determined that a gravity direction of the current display 275 is perpendicular to a long side, and it is determined that the display 275 is currently in a landscape state. When the signal source is the live broadcast application, the signal source supports the landscape state. Therefore, it may be determined that the signal source set for the starting process supports the current rotation state of the display 275, and a problem like mismatch of the picture proportion and the rotation state will not occur. That is, the signal source may be started normally, and the live broadcast application is directly run during the starting process.

When the controller 250 controls the display 275 to present a picture corresponding to the signal source for the starting process, it may be a UI of the signal source application, and may also be a playing interface corresponding to the signal source application. For example, the signal source application is a live broadcast application, and after it is determined that the signal source supports the current rotation state of the display 275, a UI home page of the live broadcast application may be presented on the display 275. Functions such as a "channel list", "live broadcast", "video on demand" and "program replay" may be selected from the UI home page of the live broadcast application, and a signal from a default channel of the live broadcast application may also be directly played, so as to obtain a live broadcast experience more similar to a traditional television.

S8, control the display to present a home page corresponding to the current rotation state in response to the signal source not supporting the current rotation state.

In the display adapting process, if the signal source set for the starting process supports the current rotation state, a picture corresponding to the signal source may be directly displayed according to a default display case of the signal source. If the signal source does not support the current rotation state, the display 275 may be controlled to display a home page corresponding to the current rotation state. On the home page, the user may launch the different applications through the interaction operations, or rotate the display 275, so that the display 275 restores to the rotation state supported by the signal source, so as to solve abnormal display problem.

For example, it is detected that a current rotating angle of the display 275 is 90 degrees through an angle sensor, and thus it may be determined that the rotation state of the display 275 is a portrait state. While when the signal source is set to a live broadcast application, because the live broadcast application only supports the landscape state, it is determined that the signal source does not support the current rotation state. If the signal source supports the current rotation state, a portrait home page may be directly displayed in the display 275, so as to adapt to the rotation state of a current portrait state.

According to the display apparatus 200 according to the above embodiments, the controller 250 may detect the signal source set for the starting of the display apparatus 200 and the current rotation state of the display 275 in response to starting of the display apparatus 200; if the signal source supports the current rotation state, the display 275 is controlled to display the picture corresponding to the signal source; and if the signal source does not support the current rotation state, the display 275 is controlled to display a home page corresponding to the current rotation state. The above display apparatus 200 may adjust a display mode of the picture of the signal source according to the rotation state of the display 275, and may solve abnormal display problem when the signal source for the starting process does not support the current rotation state by displaying the home page corresponding to the current rotation state.

Figure 18:
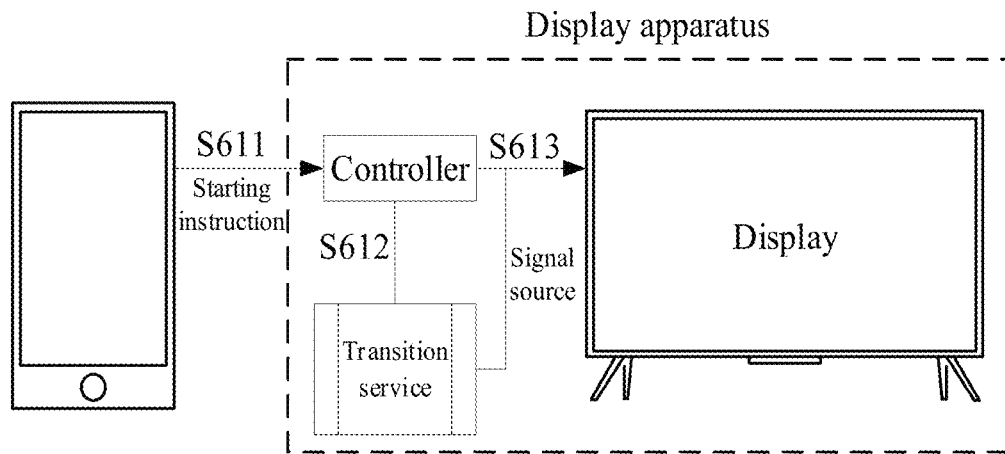
FIG. 18 is a schematic flow chart of starting a transition service according to some embodiments of the present application.

In some embodiments, as shown in FIG. 18, after the user sets the signal source for the starting process, the control system will configure a transition service for starting the signal source during the starting process, and the transition service may serve as a control program related to the starting process, and is run with the operating system after receiving a starting instruction. Therefore, the controller 250 is further configured to perform the following operations.

S611, acquire an instruction for starting a display apparatus input from a user.

S612, start a transition service, where the transition service is configured to start a signal source for the starting process.

S613, read the signal source through the transition service, and determine a rotation state supported by the signal source.

When the display apparatus 200 is subjected to alternating current-direct current starting or suspend to RAM (STR) starting, a user needs to input an instruction for starting the display apparatus through the control device 100, a terminal or a physical key of the display apparatus 200. With running of the operating system, the controller 250 may execute starting-related programs, that is, may start the transition service. The transition service may read user setting, determine the signal source and further determine whether the signal source support the rotation state.

Because all applications installed on the display apparatus 200 may serve as the signal source for the starting process, the cases of the rotation state supported by the starting signal source are different. In some cases, the signal source includes a landscape signal source which only supports the landscape state, a portrait signal source which only supports the portrait state, and a compound signal source which supports both the landscape state and the portrait state. For example, when the signal source is set to be a live broadcast application or accessed into a live broadcast signal, the signal source generally only supports the landscape state, namely, the landscape signal source. When the signal source is set to be a short video application, the signal source only supports the portrait state, namely, the portrait signal source. When the signal source is set to be a browser application, the signal source supports both the landscape state and the portrait state, namely, the compound signal source.

Figure 19:
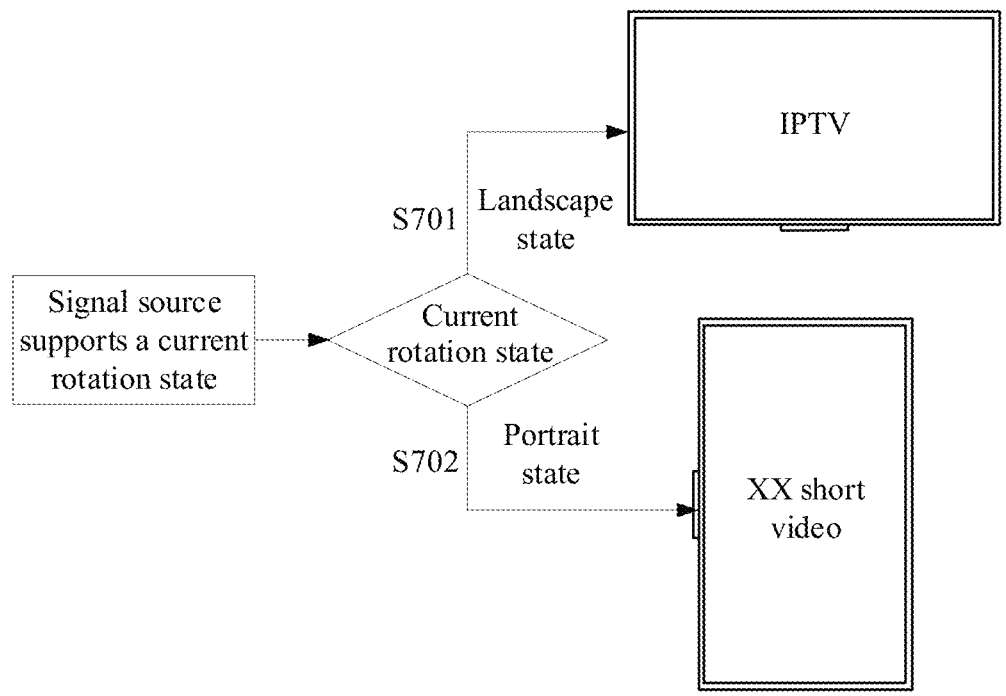
FIG. 19 is a schematic diagram of a display flow that a signal source during starting supports a current rotation state of the display apparatus according to the present application.

It can be seen that the compound signal source may support most of rotation states, and when the display 275 is in the different rotation states, picture contents provided are also different. Therefore, as shown in FIG. 19, if the signal source supports the current rotation state and the signal source is the compound signal source, the controller 250 is further configured to perform the following operations.

S701, in response to the current rotation state being the landscape state, control the display to present a picture corresponding to the signal source in the landscape state.

S702, in response to the current rotation state being the portrait state, control the display to present a picture corresponding to the signal source in the portrait state.

For example, the signal source for the starting process is a browser application, and is the compound signal source which supports both the landscape state and the portrait state. Thus the signal source supports the current rotation state when the display 275 is in the landscape state or the portrait state. That is, it is determined that the signal source supports the current rotation state, and the signal source is the compound signal source.

Because the compound signal source may present different picture contents and page layouts when the display 275 is in the different rotation states, when it is determined that the signal source for the starting process supports the current rotation state, the display 275 may further be controlled to present the picture corresponding to the rotation state according to the rotation state of the current display 275. That is, if the current rotation state is the landscape state, the display is controlled to present the picture corresponding to the signal source under the landscape state; and if the current rotation state is the portrait state, the display is controlled to display the picture corresponding to the signal source under the portrait state. For example, the signal source is the browser application, during the starting process, if the display 275 is in the landscape state, a horizontal browser interface is directly displayed; and if the display 275 is in the portrait state, a vertical browser interface is directly displayed.

It can be seen that when the signal source for the starting process supports the current rotation state and the signal source is a compound signal source, the picture content may be dynamically adjusted according to a current rotation state of the display 275, so that the picture corresponding to the signal source is adapted to the current rotation state of the display 275, thereby facilitating the user to realize the interaction operation.

Figure 20:
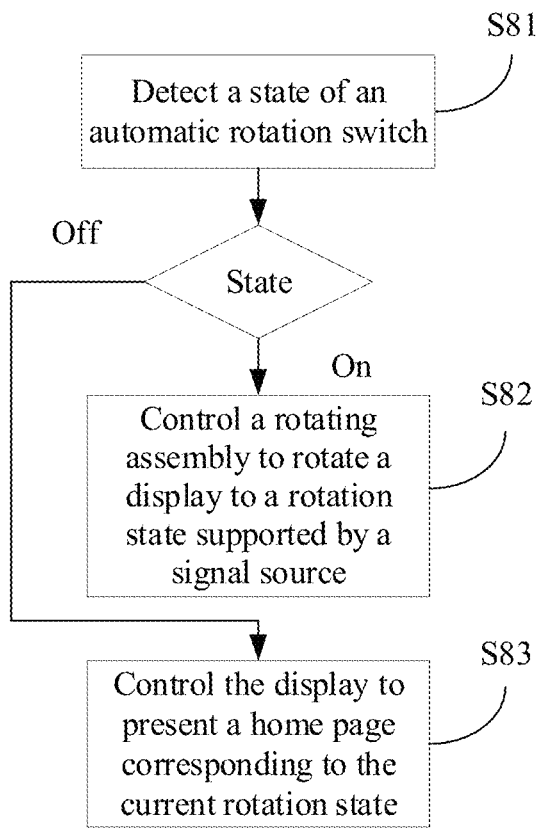
FIG. 20 is a schematic flow chart of a display method for adapting automatic rotation according to some embodiments of the present application.

In some embodiments, if the signal source does not support the current rotation state, the display 275 may be rotated through the rotating assembly 276, so as to adapt the signal source. Therefore, as shown in FIG. 20, the controller 250 is further configured to perform the following operations.

S81, detect a state of an automatic rotation switch in the display apparatus.

S82, in response to the state being an on state, control the rotating assembly to rotate the display to the rotation state supported by the signal source.

S83, in response to the state being an off state, control the display to present a home page corresponding to the current rotation state.

When setting the signal source, the setting interface further provides an option for setting the automatic rotation switch for the user. If the user sets the automatic rotation switch to be on, the display 275 may be automatically rotated through the rotating assembly 276 during starting, so as to adapt to the rotation state supported by the starting signal source.

In some embodiments, the display may be rotated before playing of the animation.

If the state of the automatic rotation switch is off, the current signal source cannot be adapted via rotating the display 275, and therefore, the display 275 may be controlled to display a home page corresponding to the current rotation state. Obviously, for the landscape state and the portrait state of the display 275, the home page includes a landscape home page and a portrait home page.

Figure 21:
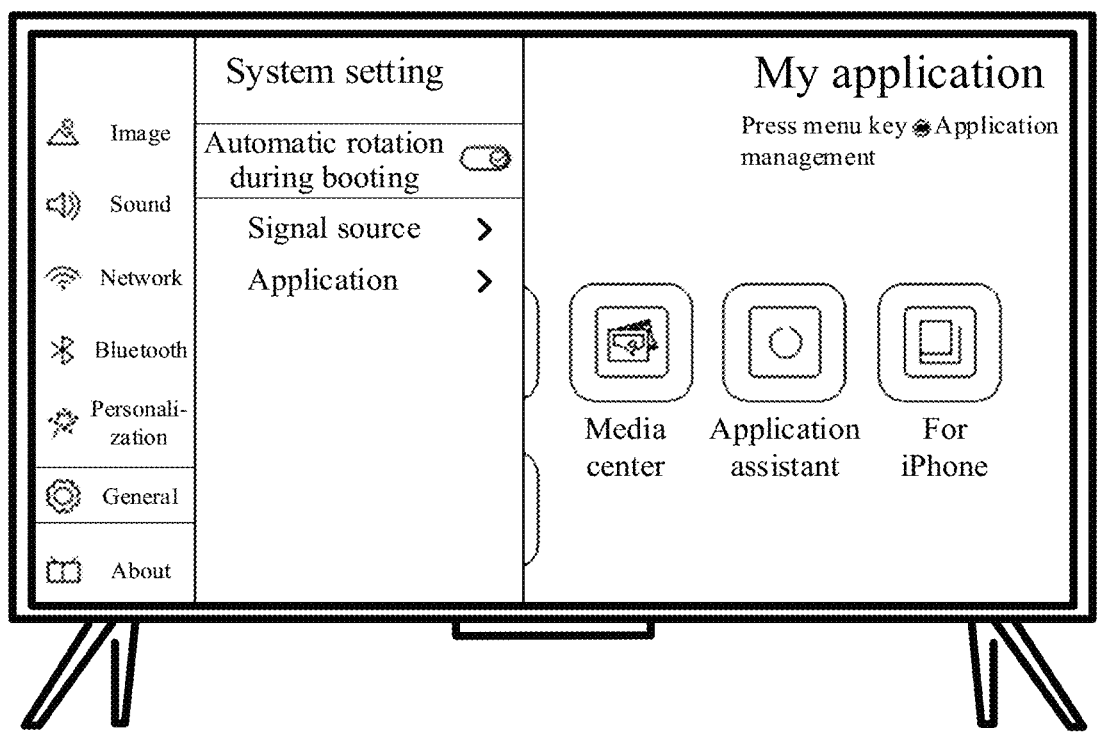
FIG. 21 is a schematic diagram of an interface for setting a signal source when starting the display apparatus according to some embodiments of the present application.

For example, as shown in FIG. 21, the live broadcast application on the setting interface is selected by the user as the signal source for the starting process, and the automatic rotation switch "automatic rotation during starting" is set to be on, and the state of the rotation switch will be written into the transition service after saving the settings. During next starting, the controller 250 reads the starting signal source and determine the live broadcast as the signal source for the starting process by the transition service, the current rotation state of the display 275 is the portrait state, and thus it is determined that the signal source does not support the current rotation state. In this case, it may be detected that the state of the automatic rotation switch is on via the transition service, and an instruction for controlling the rotating assembly 276 is generated, so that the rotating assembly 276 drives the display 275 to rotate, so as to adjust the rotation state of the display 275 to the landscape state.

For another example, if a live broadcast application is set as the signal source for the starting process on the setting interface, but the automatic rotation switch "automatic rotation during starting" is set to be off, the state of the rotation switch in the transition service is off. During next starting, the signal source being read is the live broadcast, the current rotation state of the display 275 is the portrait state, and thus it is determined that the signal source does not support the current rotation state. In this case, because the state of the automatic rotation switch is off and the display 275 cannot be adjusted to be the landscape state through the rotating assembly 276, the display 275 may be controlled to display a home page corresponding to the portrait state.

Figure 22:
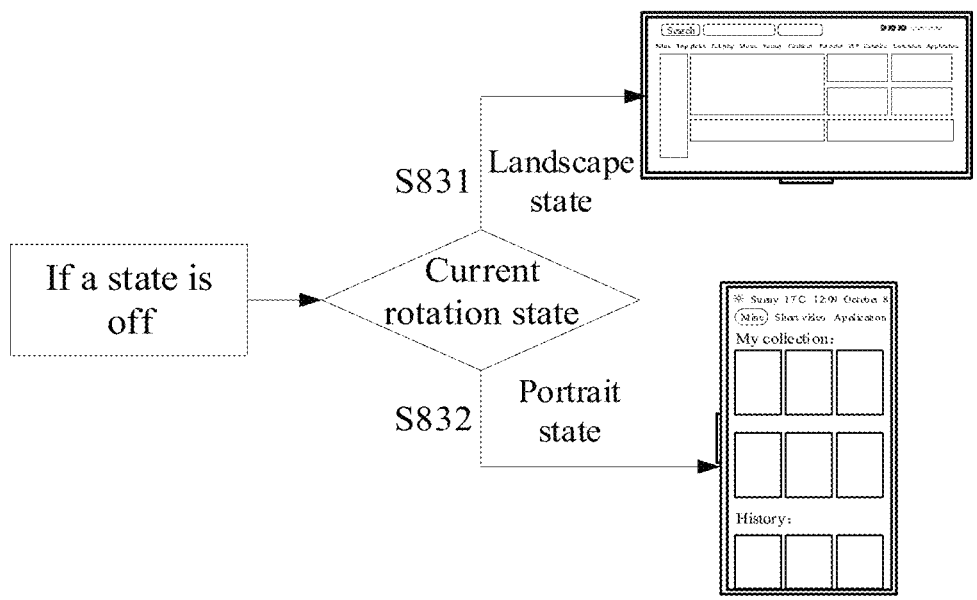
FIG. 22 is a schematic diagram of a display method when a switch state is off according to some embodiments of the present application.

Because the display 275 may be in any rotation state during starting, when the signal source for the starting process cannot be adapted through automatic rotation, the home page needs to be displayed according to the current rotation state of the display 275. That is, as shown in FIG. 22, if the state of the automatic rotation switch is off or in a case where a starting process does not support rotation, the controller 250 is further configured to perform the following operations.

S831, in response to a current rotation state of the display being the landscape state, control the display to present a landscape home page.

S832, in response to a current rotation state of the display being the portrait state, control the display to present a portrait home page.

For example, the signal source for the starting process is a live broadcast application, the rotation state of the display 275 during starting process is the portrait state, and thus the display 275 is controlled to display a portrait home page. The signal source for the starting process is a short video application, the rotation state of the display 275 during starting is the landscape state, and thus the display 275 is controlled to display a landscape home page. Similarly when the display 275 is controlled to display a home page, a resource link and layout effect adaptive to the current rotation state may also be obtained through data communication with the server 300.

In some embodiments, the rotation state further includes a rotation-locked state or a blocking state, and the rotation-locked state is any intermediate state that the display 275 is in the process of switching between the landscape state and the portrait state. In actual application, the rotation-locked state is an abnormal state. For example, sudden power failure, manual blocking and foreign matter blocking during rotating of the display 275 cause the display 275 to stop rotating, in this case, the display 275 is in a tilt state. The rotation-locked state will influence a view effect of the display apparatus 200, and the rotation-locked state needs to be restored during starting. Therefore, the controller 250 is further configured to: in response to the current rotation state of the display 275 being the rotation-locked state, control the rotating assembly 276 to rotate the display 275 to the rotation state supported by the signal source for the starting process.

For example, during the starting process, it is detected that the display 275 is in a tilting posture and rotating by 30 degrees through an angle sensor, and thus it is determined that the current rotation state of the display 275 is the rotation-locked state. In this case, if the signal source is set to be the live broadcast application, that is, the starting signal source only supports the landscape state, therefore, the controller 250 may control the rotating assembly 276 to rotate the display 275 to the landscape state, so as to adapt the starting signal source, and play the live broadcast picture.

In some embodiments, the present application further provides a display apparatus, including: a display 275, a rotating assembly 276 and a controller 250. The rotating assembly 276 is configured to drive the display 275 to rotate, so that the display 275 can reach any rotation state.

Figure 23:
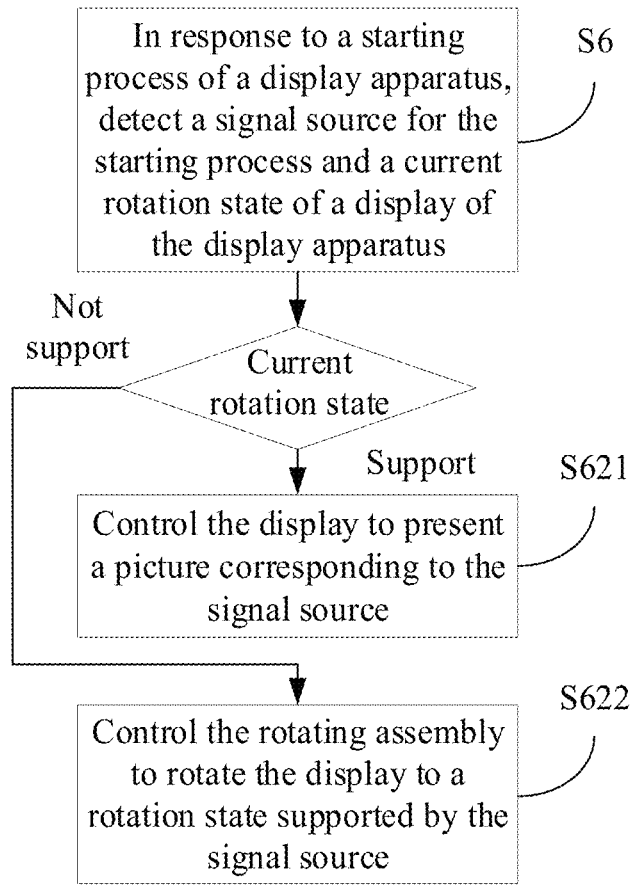
FIG. 23 is a schematic flow chart of a display method for adapting a signal source during starting according to some embodiments of the present application.

As shown in FIG. 23, the controller 250 is configured to perform the following operations.

S6, in response to a starting process of a display apparatus, detect a signal source for the starting process and a current rotation state of a display of the display apparatus.

S621, in response to the signal source supporting the current rotation state, control the display to present a picture corresponding to the signal source.

S622, in response to the signal source not supporting the current rotation state, control the rotating assembly to rotate the display to a rotation state supported by the signal source.

It can be known from the above that in the display apparatus 200 and a display method for adapting a signal source according to the present embodiments, the controller 250 of the display apparatus 200 may detect the signal source of the display apparatus 200 and the current rotation state of the display 275 after starting; if the signal source supports the current rotation state, the display 275 is controlled to display the picture corresponding to the signal source; and if the boot signal source does not support the current rotation state, the rotating assembly 276 is controlled to rotate the display 275 to the rotation state supported by the signal source. When the signal source is not matched with the current rotation state, the display apparatus 200 according to the present application may rotate the display 275 to the state supported by the signal source through the rotating assembly, so as to adapt the display requirement of the signal source.

The present application further provides a display apparatus, including: a display 275, a rotating assembly 276 and a controller 250. The rotating assembly 276 is configured to drive the display 275 to rotate, so that the display 275 can reach any rotation state.

Figure 24:
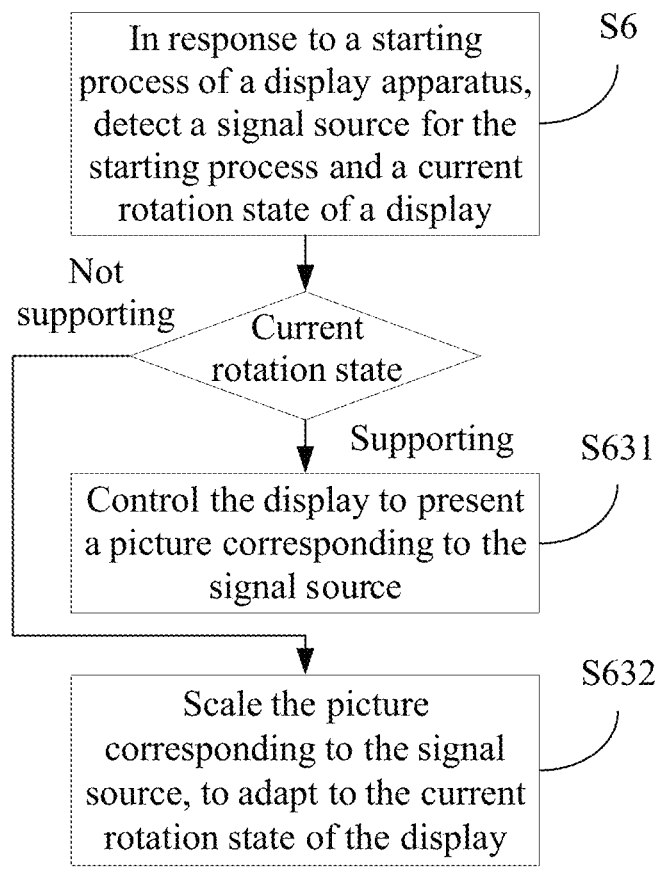
FIG. 24 is a schematic flow chart of a display method for adapting a signal source according to some embodiments of the present application.

As shown in FIG. 24, the controller 250 is configured to perform the following operations.

S6, in response to a starting process of a display apparatus, detect a signal source for the starting process and a current rotation state of a display.

S631, in response to the signal source supporting the current rotation state, control the display to present a picture corresponding to the signal source.

S632, in response to the signal source not supporting the current rotation state, scale the picture corresponding to the signal source, to adapt to the current rotation state of the display.

It can be known the controller 250 of the display apparatus 200 may detect the signal source of the display apparatus 200 and the current rotation state of the display 275 after starting; if the signal source supports the current rotation state, the display 275 is controlled to display the picture corresponding to the signal source; and if the signal source does not support the current rotation state, the picture corresponding to the boot signal source is scaled so as to adapt to the current rotation state of the display 275. By scaling the picture corresponding to the signal source, when the signal source is not matched with the current rotation state, the display picture may be adjusted on a picture quality layer, so as to display the picture corresponding to the signal source properly.

The specific embodiments provided above are only several examples of the present application, and are not intended to limit the embodiments of the present application. Those skilled in the art may make modifications based on those above embodiments. The modified embodiments and their equivalents shall fall within the protection scope of the present disclosure.

What is claimed is:

1. A display apparatus, comprising:
    a display comprising a first side and a second side, the second side being shorter than the first side;
    a rotating assembly, configured to rotate the display to a rotation state, wherein the rotation state comprises two standard states and at least one nonstandard states, the two standard states are a horizontal state and a portrait state, the at least one nonstandard state comprises a state during rotating of the display in a circle except the two standard states, the horizontal state is a state that the first side in a horizontal direction is greater than the second side in a vertical direction perpendicular to the horizontal direction, and the portrait state is a state that the second side in the horizontal direction is smaller than the first side in the vertical direction; and
    at least one processor, in connection with the display and the rotating assembly, and configured to:
        during a standby state of the display apparatus, and in response to an instruction for turning on the display apparatus from the standby state to a work state;
            detect a rotating angle of the rotating assembly that is configured to fix the display onto a wall or a bracket, and determine a physical rotation state of the display according to a relationship between the rotating angle of the rotating assembly and the physical rotation state of the display;
        in response to a determination that the physical rotation state of the display is at a nonstandard state upon turning on the display apparatus from the standby state,
            control the rotating assembly to move and, along with motion of the rotating assembly, to drive the display to rotate from the nonstandard state to a standard state, and
            control the display to be in a blank screen state in a process of rotating the display, along with the motion of the rotating assembly, from the nonstandard state to the standard state;
        in response to the physical rotation state of the display being in the horizontal state after a completion of rotating the display from the nonstandard state to the standard state, control the display to present a boot animation for the turning on of the display apparatus corresponding to the horizontal state;
        in response to the physical rotation state of the display being in the portrait state after a completion of rotating the display from the nonstandard state to the standard state, control the display to present a boot animation for the turning on of the display apparatus corresponding to the portrait state;
        while the boot animation being presented on the display, detect a signal source for content, wherein the signal source comprises one of a first signal source only supporting the horizontal state, a second signal source only supporting the portrait state, and a compound signal source supporting both the horizontal state and the portrait state, the first signal source comprises a television broadcast signal source, and the second signal source comprises a short video application signal source;
        in response to the signal source supporting the physical rotation state of the display, control the display to draw a picture corresponding to the signal source; and in response to the signal source not supporting the physical rotation state of the display, control the display to draw a home page corresponding to the current physical rotation state of the display,
    wherein the content, corresponding to the picture, or the home page is displayed after a completion for presenting the boot animation.

2. The display apparatus according to claim 1, wherein the at least one processor is further configured to:

display the boot animation on an upper layer of an interface from the signal source or the home page; and in response to the boot animation completing displaying, display an interface from the signal source or the home page corresponding to the physical rotation state on the display.

3. The display apparatus according to claim 1, wherein the at least one processor is further configured to:

acquire the instruction for turning on the display apparatus input from a user;

in response to the instruction, start a transition service, wherein the transition service is configured to start the signal source set for a starting process as default; and read the signal source through the transition service, and determine which rotation state is supported by the signal source.

4. The display apparatus according to claim 1, wherein the at least one processor is further configured to:

in response to the physical rotation state of the display being the horizontal state and the signal source being the first signal source, control the display to present a horizontal animation, and upon completing displaying of the horizontal animation, present a horizontal interface from the signal source on the display;

in response to the physical rotation state of the display being the horizontal state and the signal source being the portrait signal source, control the display to present a horizontal animation, and upon completing displaying of the horizontal animation, present a home page corresponding to the horizontal state on the display; and in response to the physical rotation state of the display being the horizontal state and the signal source being the compound signal source, control the display to present a horizontal animation, and upon completing displaying of the horizontal animation, present a picture from the compound signal source adaptive to the horizontal state on the display.

5. The display apparatus according to claim 1, wherein the at least one processor is further configured to:

in response to the physical rotation state of the display being the portrait state and the signal source being the first signal source, control the display to present a horizontal animation, and upon completing displaying of the horizontal animation, present a home page corresponding to the portrait state on the display;

in response to the physical rotation state of the display being the portrait state and the signal source being the second signal source, control the display to present a portrait animation, and upon completing displaying of the portrait animation, present a portrait interface from the signal source on the display; and in response to the physical rotation state of the display being the portrait state and the signal source being the compound signal source, control the display to present a portrait animation, and upon completing displaying of the portrait animation, present an interface from the compound signal source adaptive to the portrait state on the display.

6. The display apparatus according to claim 1, further comprising an acceleration sensor connected to the at least one processor, wherein the at least one processor is further configured to:

in response to the turning on of the display apparatus, control the display to present a logo picture; and detect the physical rotation state of the display through the acceleration sensor during displaying of the logo picture.

7. The display apparatus according to the claim 1, wherein the at least one processor is further configured to:

send a request for home page data corresponding to a standard state of the display to a server;

receive the home page data returned from the server based on the request; and control the display to present a home page according to the home page data.

8. The display apparatus according to claim 1, wherein for rotating the display from the nonstandard state to the standard state, the at least one processor is further configured to:

extracting an original rotation state and a target rotation state in a previous use of the display apparatus;

determining a rotating direction according to the original state and the target state in the previous use of the display apparatus;

obtaining a current rotating angle data of the rotating assembly;

generating a rotating angle based on the current rotating angle data; and controlling the rotating assembly to rotate according to the rotating angle and the rotating direction.

9. A display method for a display apparatus with a rotatable display, comprising:

during a standby state of the display apparatus, and in response to an instruction for turning on the display apparatus from the standby state to a work state;

detect a rotating angle of the rotating assembly that is configured to fix the display onto a wall or a bracket, and determine a physical rotation state of the display according to a relationship between the rotating angle of the rotating assembly and the physical rotation state of the display;

in response to a determination that the physical rotation state of the display is at a nonstandard state upon turning on the display apparatus from the standby state, control the rotating assembly to move and, along with motion of the rotating assembly, to drive the display to rotate from the nonstandard state to a standard state, and control the display to be in a blank screen state in a process of rotating the display, along with the motion of the rotating assembly, from the nonstandard state to the standard state;

in response to the physical rotation state of the display being in a horizontal state after a completion of rotating the display from the nonstandard state to the standard state, controlling the display to present a boot animation for the turning on of the display apparatus corresponding to the horizontal state;

in response to the physical rotation state of the display being in a portrait state after a completion of rotating the display from the nonstandard state to the standard state, controlling the display to present a boot animation for the turning on of the display apparatus corresponding to the portrait state;

while the boot animation being presented on the display, detecting a signal source for content, wherein the signal source comprises one of a first signal source only supporting the horizontal state, a second signal source only supporting the portrait state, and a compound signal source supporting both the horizontal state and the portrait state, the first signal source comprises a television broadcast signal source, and the second signal source comprises a short video application signal source;

in response to the signal source supporting the physical rotation state of the display, controlling the display to draw a picture corresponding to the signal source; and in response to the signal source not supporting the physical rotation state of the display, controlling the display to draw a home page corresponding to the physical rotation state of the display; and wherein the content, corresponding to the picture, or the home page is displayed after a completion for presenting the boot animation.

10. The display method according to claim 9, further comprising:

displaying the boot animation on an upper layer of an interface from the signal source or the home page; and in response to the boot animation completing displaying, displaying an interface from the signal source or the home page corresponding to physical rotation state on the display.

11. The display method according to claim 9, further comprising:

acquiring the instruction for turning on the display apparatus input from a user;

in response to the instruction, starting a transition service, wherein the transition service is configured to start the signal source set for a starting process as default; and reading the signal source through the transition service, and determining which rotation state is supported by the signal source.

12. The display method according to claim 9, further comprising:

in response to the physical rotation state of the display being the horizontal state and the signal source being the first signal source, controlling the display to present a horizontal animation, and upon completing displaying of the horizontal animation, presenting a horizontal interface from the signal source on the display;

in response to the physical rotation state of the display being the horizontal state and the signal source being the portrait signal source, controlling the display to present a horizontal animation, and upon completing displaying of the horizontal animation, presenting a home page corresponding to the horizontal state on the display; and in response to the physical rotation state of the display being the horizontal state and the signal source being the compound signal source, controlling the display to present a horizontal animation, and upon completing displaying of the horizontal animation, presenting a picture from the compound signal source adaptive to the horizontal state on the display.

13. The display method according to claim 9, further comprising:

in response to the physical rotation state of the display being the portrait state and the signal source being the first signal source, controlling the display to present a horizontal animation, and upon completing displaying of the horizontal animation, presenting a home page corresponding to the portrait state on the display;

in response to the physical rotation state of the display being the portrait state and the signal source being the second signal source, controlling the display to present a portrait animation, and upon completing displaying of the portrait animation, presenting a portrait interface from the signal source on the display; and in response to the physical rotation state of the display being the portrait state and the signal source being the compound signal source, controlling the display to present a portrait animation, and upon completing displaying of the portrait animation, presenting an interface from the compound signal source adaptive to the portrait state on the display.

14. The display method according to claim 9, further comprising:

in response to the turning on of the display apparatus, controlling the display to present a logo picture; and detecting the physical rotation state of the display through the acceleration sensor during displaying of the logo picture.

15. The display method according to claim 9, further comprising:

sending a request for home page data corresponding to a standard state of the display to a server;

receiving the home page data returned from the server based on the request; and controlling the display to present a home page according to the home page data.

16. The display method according to claim 9, wherein rotating the display from the nonstandard state to the standard state further comprises:

extracting an original rotation state and a target rotation state in a previous use of the display apparatus;

determining a rotating direction according to the original state and the target state in the previous use of the display apparatus;

obtaining a current rotating angle data of the rotating assembly;

generating a rotating angle based on the current rotating angle data; and controlling the rotating assembly to rotate according to the rotating angle and the rotating direction.

* * * * *